United States Patent [19]
Harnden, Jr. et al.

[11] Patent Number: 4,626,698
[45] Date of Patent: Dec. 2, 1986

[54] ZERO CROSSING SYNCHRONOUS AC SWITCHING CIRCUITS EMPLOYING PIEZOCERAMIC BENDER-TYPE SWITCHING DEVICES

[75] Inventors: John D. Harnden, Jr., Schenectady; William P. Kornrumpf, Albany; George A. Farrall, Rexford, all of N.Y.

[73] Assignee: General Electric Company, Schenectady, N.Y.

[21] Appl. No.: 685,107

[22] Filed: Dec. 21, 1984

[51] Int. Cl.[4] .................... H02J 3/00

[52] U.S. Cl. .................... 307/38; 307/35; 307/42; 307/252 UA; 323/319; 361/207; 310/317

[58] Field of Search .................... 307/38, 39, 34, 35, 307/40, 41, 42, 252 UA; 323/235, 319; 318/116; 361/207; 310/316-318, 330-332; 331/154, 158, 160

[56] References Cited

U.S. PATENT DOCUMENTS

| | | | |
|---|---|---|---|
| 2,166,763 | 7/1939 | Mason | 175/320 |
| 2,587,482 | 2/1952 | Keller | 361/207 X |
| 2,927,255 | 3/1960 | Diesel | 361/207 |
| 2,975,354 | 3/1961 | Rosen | 321/8 |
| 3,381,226 | 4/1968 | Jones et al. | 328/3 |
| 3,486,042 | 12/1969 | Watrous | 328/1 X |
| 3,506,852 | 4/1970 | Hart | 307/252 B |
| 3,555,292 | 1/1971 | Henry | 323/319 X |
| 3,633,094 | 1/1972 | Clements | 307/252 UA X |
| 3,673,487 | 6/1972 | Hendrickson | 307/252 UA X |
| 3,777,093 | 12/1973 | Sterns et al. | 361/207 X |
| 3,879,652 | 4/1975 | Billings | 307/252 UA X |
| 3,890,562 | 6/1975 | West | 307/252 UA X |
| 3,936,726 | 2/1976 | Kelley | 307/252 UA X |
| 3,989,964 | 11/1976 | Gikow et al. | 361/207 X |
| 4,245,184 | 1/1981 | Billings et al. | 361/3 X |
| 4,296,449 | 10/1981 | Eichelberger | 361/3 |
| 4,334,147 | 6/1982 | Payne | 307/38 X |
| 4,392,171 | 7/1983 | Kornrumpf | 361/5 |
| 4,395,651 | 7/1983 | Yamamoto | 310/317 |
| 4,403,166 | 9/1983 | Tanaka et al. | 310/332 |
| 4,417,199 | 11/1983 | Jones | 323/319 |
| 4,490,771 | 12/1984 | Huber et al. | 307/252 UA X |
| 4,528,494 | 7/1985 | Bloomer | 323/235 X |
| 4,567,425 | 1/1986 | Bloomer | 323/235 X |

*Primary Examiner*—William M. Shoop, Jr.
*Assistant Examiner*—Shik Luen Paul Ip
*Attorney, Agent, or Firm*—J. F. McDevitt; Philip L. Schlamp; Fred Jacob

[57] ABSTRACT

Zero crossing synchronous AC switching circuits are provided which employ piezoelectric ceramic bender-type switching devices for use in supplying loads of a resistive, inductive or capacitive nature. The circuits include zero crossing sensing sub-circuits for sensing the passage through zero value of a supply source of alternating current voltage and/or current and for deriving zero crossing timing signals representative of the occurrance of the zero crossings. The zero crossing timing signals are employed to control operation of a bender energizing potential control sub-circuit for selectively controlling application or removal of a bender energizing potential across the piezoelectric bender member of the bender-type switching devices. Phase shift networks are included in the circuit for shifting the phase or time of application of the selectively applied bender energization potential so as to cause it to close or open a set of load current carrying switch contacts substantially at or near the naturally occurring zero crossings of the applied alternating current supplying the load.

41 Claims, 45 Drawing Figures

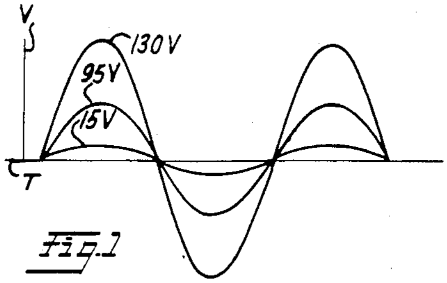
Fig. 1
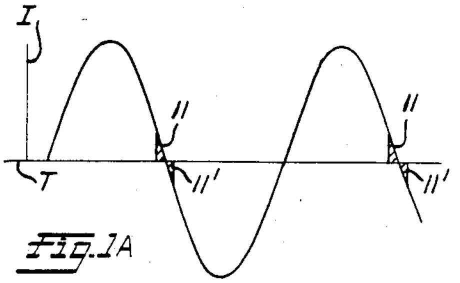
Fig. 1A
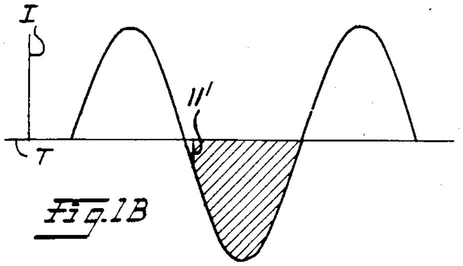
Fig. 1B
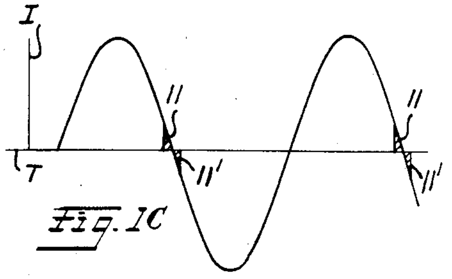
Fig. 1C
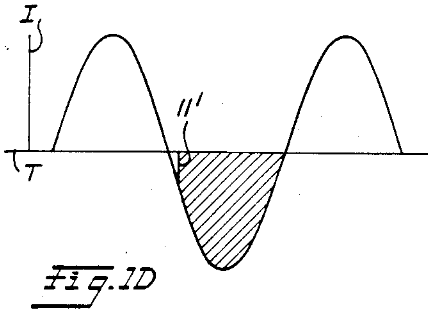
Fig. 1D
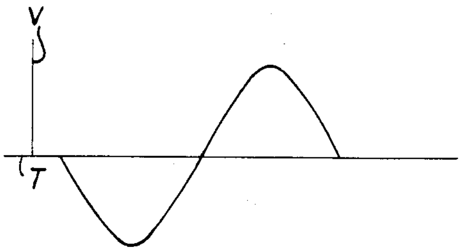
Fig. 2
Fig. 2A
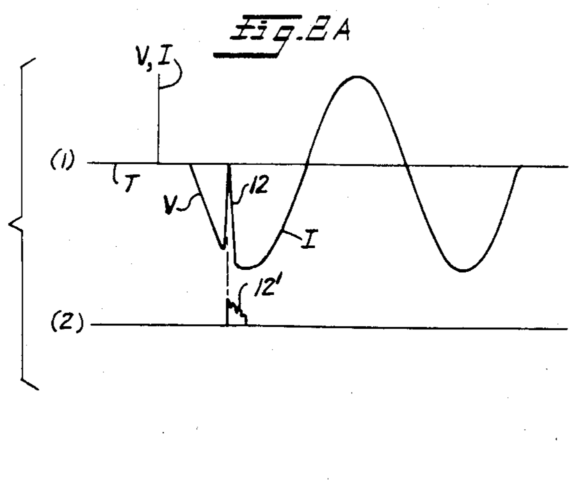
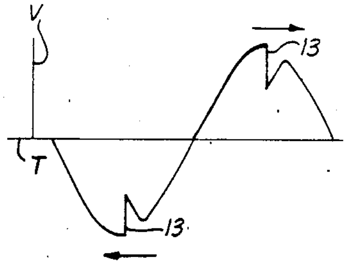
Fig. 2B

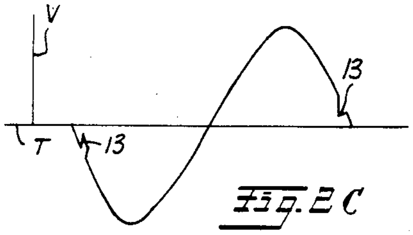
Fig. 2C
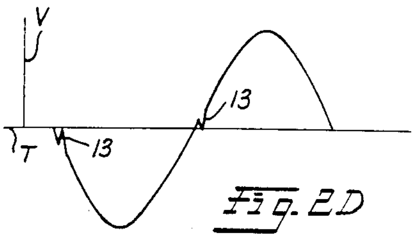
Fig. 2D
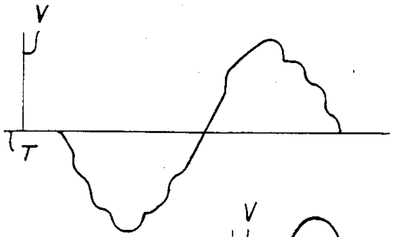
Fig. 2E
Fig. 3
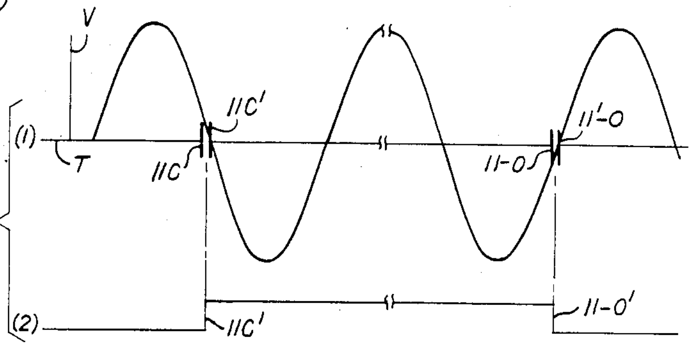
Fig. 3A
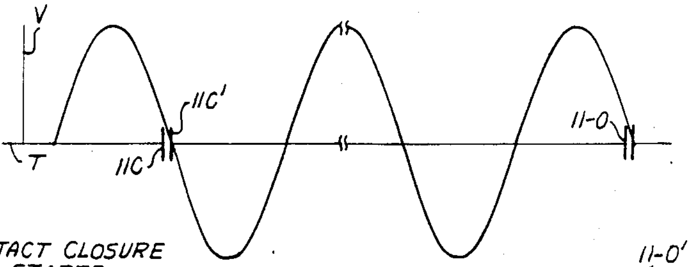
Fig. 3B
Fig. 3C
Fig. 3D
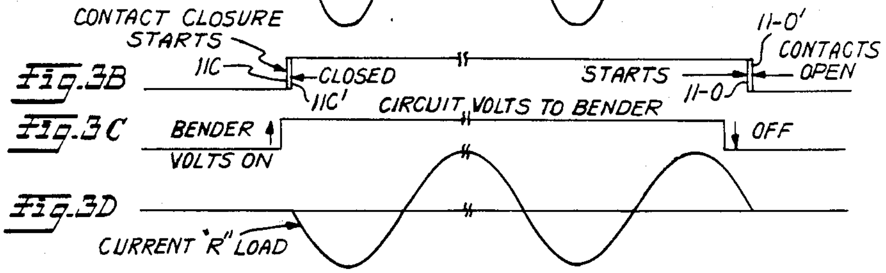

LOAD
INPUT NETWORK
120V A.C.
23A
23B
BISTABLE U1
BISTABLE LATCH
DUAL TIME DELAY
OUTPUT COMPARATOR
ZERO CROSS DETECT
OUTPUT DRIVE CIRCUIT
SINGLE PHASE — DOUBLER POWER SUPPLY

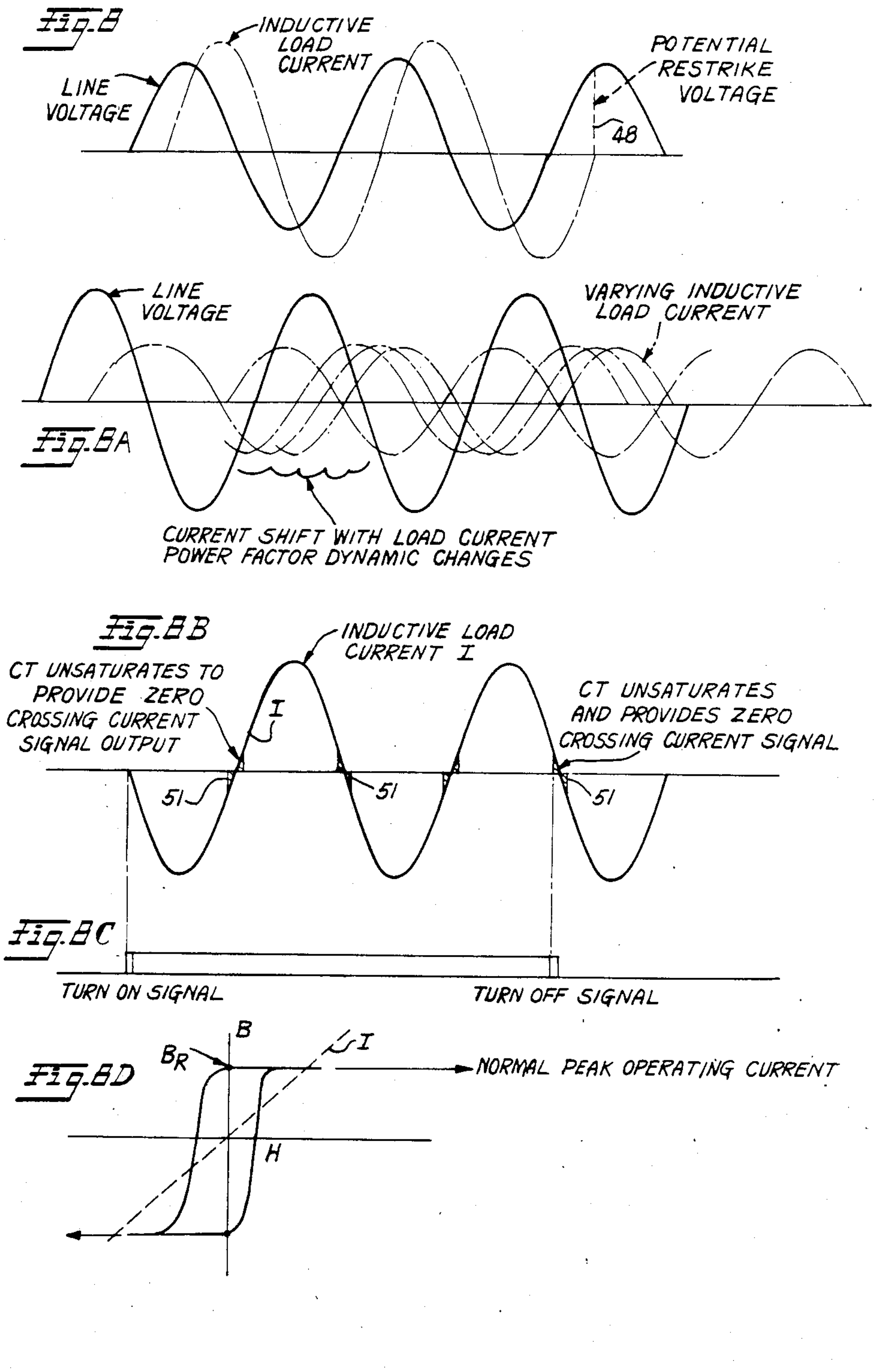
Fig. 8
INDUCTIVE LOAD CURRENT
LINE VOLTAGE
POTENTIAL RESTRIKE VOLTAGE
48
LINE VOLTAGE
VARYING INDUCTIVE LOAD CURRENT
Fig. 8A
CURRENT SHIFT WITH LOAD CURRENT POWER FACTOR DYNAMIC CHANGES
Fig. 8B
INDUCTIVE LOAD CURRENT I
CT UNSATURATES TO PROVIDE ZERO CROSSING CURRENT SIGNAL OUTPUT
I
CT UNSATURATES AND PROVIDES ZERO CROSSING CURRENT SIGNAL
51
51
51
Fig. 8C
TURN ON SIGNAL
TURN OFF SIGNAL
Fig. 8D
B
$B_R$
I
NORMAL PEAK OPERATING CURRENT
H

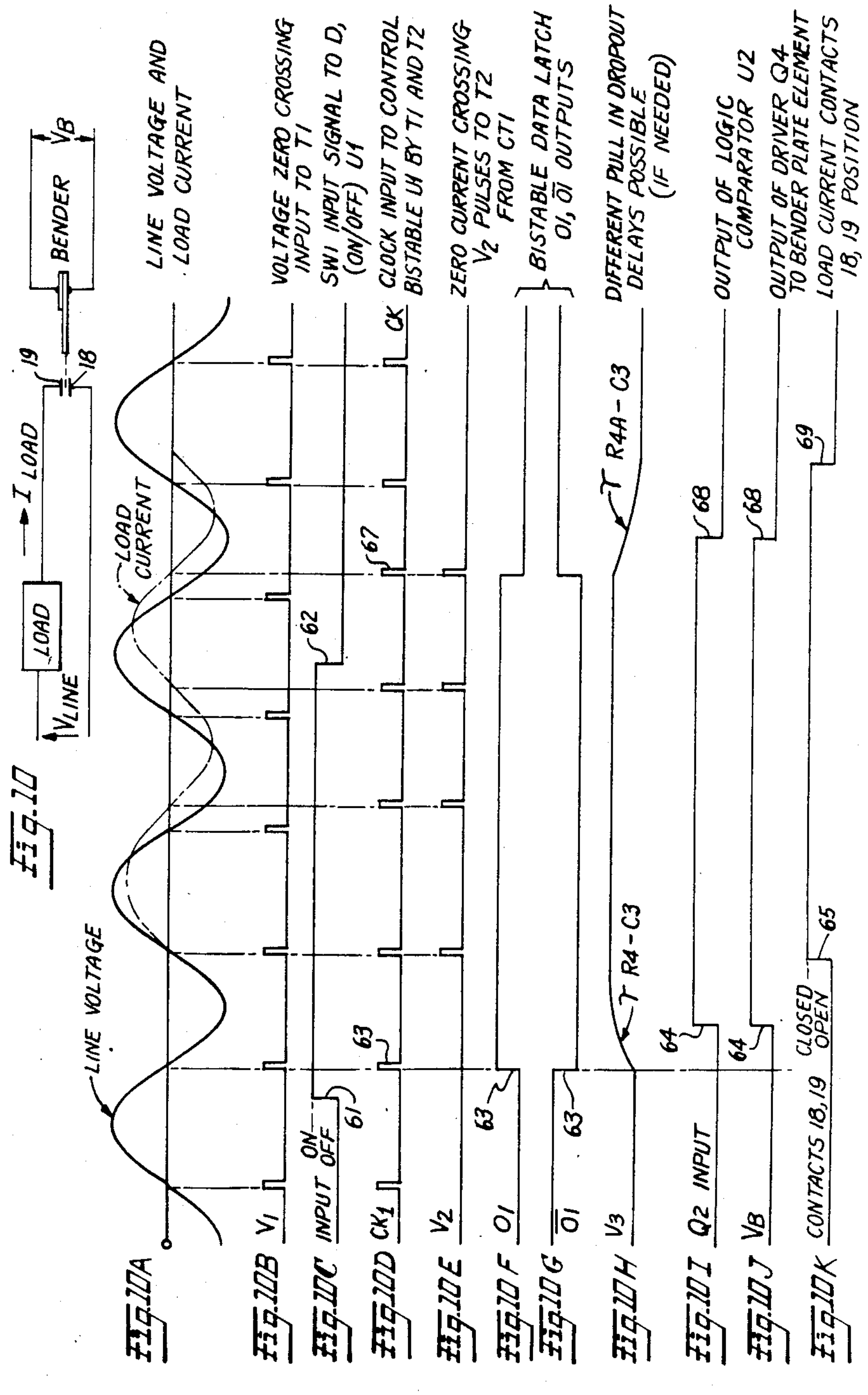
FIG. 10
FIG. 10A
FIG. 10B
FIG. 10C
FIG. 10D
FIG. 10E
FIG. 10F
FIG. 10G
FIG. 10H
FIG. 10I
FIG. 10J
FIG. 10K
LOAD
BENDER
$V_{LINE}$
$I_{LOAD}$
$V_B$
19
18
LINE VOLTAGE
LOAD CURRENT
LINE VOLTAGE AND LOAD CURRENT
$V_1$
VOLTAGE ZERO CROSSING INPUT TO T1
INPUT
ON
OFF
61
62
SW1 INPUT SIGNAL TO D, (ON/OFF) U1
$CK_1$
63
67
CK
CLOCK INPUT TO CONTROL BISTABLE U1 BY T1 AND T2
$V_2$
ZERO CURRENT CROSSING $V_2$ PULSES TO T2 FROM CT1
O1
$\overline{O1}$
BISTABLE DATA LATCH O1, $\overline{O1}$ OUTPUTS
$V_3$
R4-C3
R4A-C3
DIFFERENT PULL IN DROPOUT DELAYS POSSIBLE (IF NEEDED)
Q2 INPUT
64
68
OUTPUT OF LOGIC COMPARATOR U2
$V_B$
OUTPUT OF DRIVER Q4 TO BENDER PLATE ELEMENT
CONTACTS 18,19
CLOSED
OPEN
65
69
LOAD CURRENT CONTACTS 18,19 POSITION

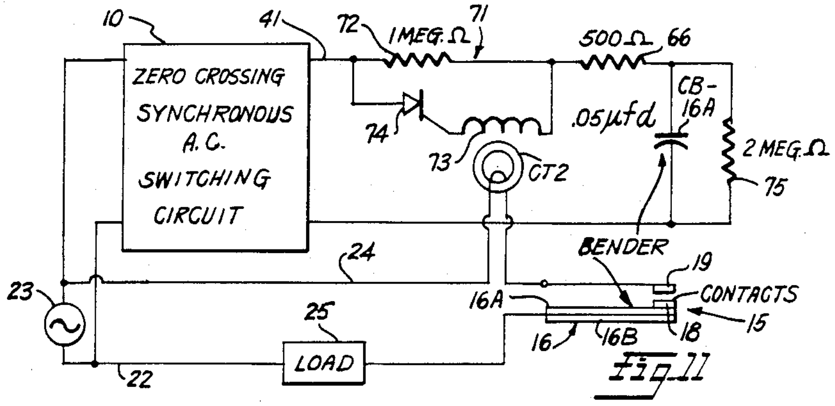
Fig. 11
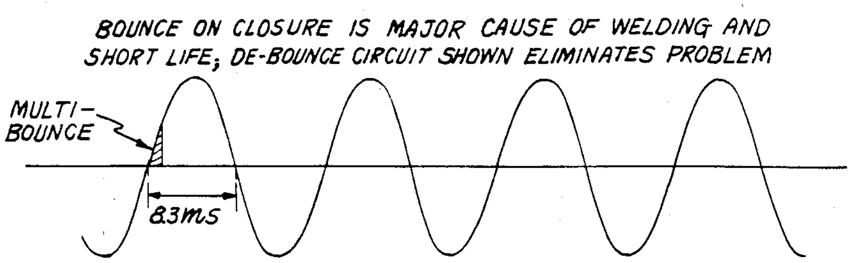
Fig. 11A
Fig. 11B
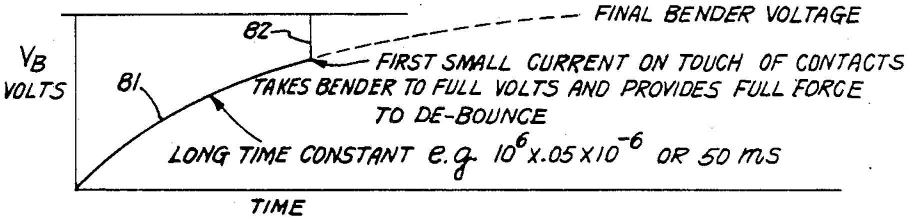
Fig. 11C
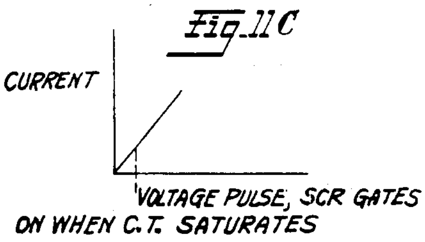
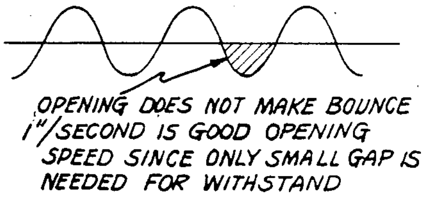
Fig. 11D

ZERO CROSSING SYNCHRONOUS AC SWITCHING CIRCUITS EMPLOYING PIEZOCERAMIC BENDER-TYPE SWITCHING DEVICES

TECHNICAL FIELD

This invention relates to novel zero crossing synchronous AC switching circuits employing improved piezoceramic bender-type switching devices that open or close a set of load current carrying switch contacts to make or break alternating current flow supplied to a load through the switch contacts. The switch contacts in their open condition are separated by a circuit breaking open gap that is filled with an ambient atmosphere in which the contacts are mounted such as air, an inert protective gas or a vacuum so as to provide high voltage withstandability. With the contacts open the circuit possesses no inherent or prospective low value current leakage paths in contrast to switching systems employing contacts having parallel connected semiconductor devices for assisted commutation or turn-on purposes.

More particularly, the invention relates to zero crossing synchronous AC switching circuits having the above set forth characteristics which employ improved piezoceramic bender-type switching devices as disclosed in co-pending U.S. patent application Ser. No. 685,109 entitled "Improved Piezoelectric Ceramic Switching Devices and Systems and Method of Making the Same", John D. Harnden, Jr. and William P. Kornrumpf, inventors and/or U.S. patent application Ser. No. 685,108 entitled "Advanced Piezoceramic Power Switching Devices Employing Protective Gastight Enclosure and Method of Manufacture", John D. Harnden, Jr., William P. Kornrumpf and George A. Farrall—inventors, both applications being filed concurrently herewith and assigned to the General Electric Company, the same assignee to whom the present application is assigned. The disclosures of these two co-pending applications hereby are incorporated into this application in their entirety.

BACKGROUND PRIOR ART PROBLEM

U.S. Pat. No. 4,392,171 for a "Power Relay With Assisted Commutation"—issued July 5, 1983—William P. Kornrumpf, inventor and assigned to the General Electric Company, discloses an electromagnetic (EM) relay with assisted commutation wherein the load current carrying contacts of the relay are shunted by a gatable semiconductor device that assists in commutation of contact destroying arcs normally produced upon closure and opening of such contacts. This device is typical of AC power switching systems which employ a parallel-connected semiconductor device connected across a set of current interrupting power switch contacts for temporarily diverting the current being interrupted during opening or closure of the contacts. After current interruption and with the relay contacts opened, there still exists a high resistance current leakage path through the parallel connected gatable semiconductor device in its off condition due to the inherent characteristics of the semiconductor device. Underwriter Labs (U.L.) has decreed that such switching circuits are not satisfactory for use with home appliances and other similar apparatus due to the prospective danger of the high resistance current leakage paths electrically charging the home appliance or other apparatus to a high electric potential that could prove injurious or lethal or otherwise fail in a non-safe manner.

U.S. Pat. No. 4,296,449, issued Oct. 20, 1981 for a "Relay Switching Apparatus"—C. W. Eichelberger—inventor, assigned to the General Electric Company, discloses an AC power switching circuit that employs a diode commutated master electromagnetic operated relay in conjunction with a pilot EM operated relay with the switch contacts of the master and pilot relays being connected in series circuit relationship between a load and an AC power source. In this arrangement, the second pilot relay is not connected in parallel with a commutation and turn-on assistance diode so that the arrangement does provide a positive circuit break in the form of an air gap between the contacts of the pilot relay between a load and an AC supply source in conformance with U.L. requirements for such switching devices. However, the system described in U.S. Pat. No. 4,296,449 is not designed to operated as a zero crossing synchronous AC switching system, and it is not known at what point in the cycle of an applied alternating current supply potential, opening or closure of the relay contacts takes place. This is due in a great measure to the slow response characteristics of electromagnetic relays generally and to the further fact that EM relays experience shifts in magnetic material characteristics, heat and age related changes, contact surface and air-gap changes and changes in the manner of movement of the relay armature resulting from the combined effect of all of the above-noted factors. Attempts to force the EM relay to obtain faster response speeds serves to increase the magnitude of these effects. An EM atuated circuit interrupter for interrupting AC currents synchronously with the passage through zero value of the AC current is described in a textbook entitled "Electrical Contacts" by G. Windred, published by MacMillan and Co., Ltd. of London, England, copyrighted 1940, see pages 194 through 197. Such a device operates to interrupt only and cannot be used for closing to initiate AC load current flow synchronously. While there may be some EM operated relays which can be used for synchronous closing of AC switch contacts, but they are not known to the inventors. Thus, zero crossing synchronous AC operation for the opening and closing with EM relay actuated switching devices is not feasible with state of the art EM relay devices.

Making and breaking current flow through a set of electric load current carrying switch contacts is a relatively complex event in the microscopic world of the forces and effects occurring at the time of contact closure and/or opening as explained more fully in the textbook entitled "Vacuum Arcs—Theory and Application"—J. M. Lafferty—editor, published by John Wiley and Son—New York, N.Y. and copyrighted in 1980. Reference is made in particular to Chapter 3 entitled "Arc Ignition Processing" of the above-noted textbook which chapter was authored by George A. Farrall, a co-inventor of the invention described and claimed in this application. From this publication it is evident that contacts of a load current carrying electric switch when overloaded, or after extended operating life, are subject to the possibility of thermal run-away which can lead to contact welding and/or creation of a fire. This can occur even though the contacts are operated perfectly during use and perform only a current carrying function. Even under conditions where there is no substantial current flow across the contacts, opening and closing of the contacts under conditions where a high operating voltage exists across the contacts, causes mechanical wear and tear so that the actual gaps between the contacts at the time of current establishment and/or extinction can change due to the effects of sparking and arcing. Thus, the long term operating characteristics of the switch contacts of a EM relay operated switch such as that described in U.S. Pat. No. 4,296,449 and other similar systems which open or close switch contacts under high voltage stress, can and do change after a period of usage.

Zero current synchronous AC switching circuits employing semiconductor switching devices such as SCRs, triacs, diacs and the like, have been known to the industry for a number of years. This is evidenced by prior U.S. Pat. No. 3,381,226 for "Zero Crossing Synchronous Switching Circuits for Power Semiconductors"—issued Aug. 30, 1968, Clifford M. Jones and John D. Harnden, Jr.—inventors, and U.S. Pat. No. 3,486,042 for "Zero Crossing Synchronous Switching Circuits for Power Semiconductors Supplying Non-Unity Power Factor Loads"—D. L. Watrous, inventor—issued Dec. 23, 1969, both assigned to the General Electric Company. Zero current synchronous AC switching circuits are designed to effect closure or opening of a set of load current carrying switch contacts (corresponding to rendering a semiconductor switching device conductive or non-conductive, respectively) at the point in the cyclically varying alternating current waves when either the voltage or current, or both, are passing through their zero value or as close thereto as possible. This results in greatly reducing the sparking and arc inducing current and voltage stresses occurring across the switch contacts (power semiconductor switching device) as the contacts close or open (corresponding to a power semiconductor device being gated-on or turned-off) to establish or interrupt load current flow, respectively. While such zero current synchronous AC switching circuits employing power semiconductor switching devices are suitable for many applications, they still do not meet the U.L. requirements of providing an open circuit gap between a current source and a load while in the off condition. Instead, while off, power semiconductor switching devices provide a high resistance current leakage path between a current source and a load. This is due to the inherent nature of power semiconductor switching devices. Again, their failure mechanism is non-fail safe. Additionally, it should be noted that the known prior art zero crossing synchronous AC switching circuits employing power semiconductor switching devices have response characteristics that are substantially instantaneous in that they turn-on or turn-off within a matter of microseconds after application of a turn-on or turn-off gating signal to the power semiconductor switching device. Hence, due to their fast responding nature, the known zero crossing synchronous AC switching circuits employing power semiconductor devices are unusable with mechanically opened and closed switch contact systems such as are used in the present invention.

SUMMARY OF INVENTION

It is therefore a primary object of the present invention to provide new and improved zero crossing synchronous AC switching circuits employing piezoceramic bender-type switching devices that are relatively much faster responding than known EM operated power switching circuits (but considerably slower responding than power semiconductor switching devices) and which in the off condition provide an open circuit break having an infinitely high resistance of the order of $10^9$ ohms (1000 megohms) in a circuit in which they are used to control electric current flow through a load in conformance with U.L. requirements.

Another object of the invention is to provide novel zero crossing synchronous AC switching circuits employing piezoelectric ceramic bender-type switching devices having the above-noted characteristics and which do not require semiconductor commutation and/or turn-off assistance circuitry or other components that would introduce high resistance current leakage paths in the AC supply current path to a load.

A further object of the invention is to provide novel zero crossing synchronous AC switch circuits having the above-listed characteristics and which employ novel piezoelectric ceramic bender-type switching devices of the type described and claimed in the above-referenced co-pending U.S. patent application Ser. No. 685,109 and U.S. patent application Ser. No. 685,108, filed concurrently with this application.

A still further object of the invention is to provide novel zero crossing synchronous AC switching circuits having the above-described characteristics which further include a novel piezoelectric ceramic bender-type switching device bender member energizing potential control circuit. The bender energizing potential control circuit includes means for initially impressing a relatively lower voltage electric energizing potential across the bender member of the piezoelectric ceramic switching device and load current controlled bender voltage control means responsive to low initial values of load current flow through the load current carrying contacts of the switching device for subsequently increasing substantially the voltage value of the energizing potential applied to the bender member to a relatively large value to enhance contact closure and reduce contact bounce and to increase contact compressive force after initial contact closure.

A still further object of the invention is to provide a novel piezoelectric ceramic bender-type switching device bender member energizing potential control circuit having the characteristics listed in the preceeding paragraph.

In practicing the invention, a novel zero crossing synchronous AC switching circuit for alternating current systems is provided which employs at least one piezoelectric ceramic bender-type switching device having load current carrying, mechanically movable electric switch contacts and at least one prepolarized piezoelectric ceramic bender member for selectively moving the contacts to close or open the electric switch and control load current flow to a load. Zero crossing sensing circuit means are provided for sensing the passage through zero value of a supply source of alternating current applied across the circuit and for deriving zero crossing timing signals representative of the occurrence of the zero crossings. Bender energizing potential control circuit means are provided which are responsive to the zero crossing timing signals for controlling selective application or removal of a bender energizing potential across the piezoelectric bender member of the bender-type switching device. The circuit is completed by phase shift circuit means effectively responsive to the applied alternating current for shifting the time of application or removal of the bender energizing potential by a preselected phase shift interval relative to the naturally occurring zero crossings of the applied alternating current.

Another feature of the invention is the provision of a zero crossing synchronous AC switching circuit having the above-described features and which further includes at least one signal level user operated on-off switch connected to the bender energizing potential control circuit means for selectively activating or deactivating the bender energizing potential control circuit means upon user demand in conjunction with the zero crossing timing signals.

Still another feature of the invention is the provision of a zero crossing synchronous AC switching circuit having the above characteristics wherein the period of time corresponding to the preselected phase shift interval introduced by the phase shift circuit means is sufficient to accommodate at least the capacitance charging time of the piezoelectric ceramic bender member and the time required for the bender-type switching device to move the bender member and close or open the set of load current carrying switch contacts to thereby supply or interrupt alternating current flow to a load. In such circuit, the preselected phase shift interval introducted by the phase shift circuit means leads the naturally occurring zero crossings of the applied alternating current and the period of time corresponding to the preselected phase shift interval further includes time required to accommodate any contact bounce that occurs during closure and/or opening of the load current carrying switch contacts and other microscopically occurring switch contact perturbations in order that current extinction during opening and establishment of current flow during closure of the switch contacts occurs at or close to the naturally occuring zero crossings of the applied alternating current.

A further feature of the invention is the provision of a zero crossing synchronous AC switching circuit having the above features which further includes load current carrying terminal bus bar conductor means for interconnecting the load via the bender actuated load current carrying switch contacts across the source of applied alternating current at interconnection points in advance of the zero crossing sensing circuit means. The circuit thus provided further includes an input network interconnected between the source of applied alternating current and the zero crossing sensing means with the input network comprising a metal oxide varistor voltage transient suppressor and a filter network connected between the source of alternating current and the input to the zero crossing sensing circuit means. The terminal bus bar conductor means interconnecting the load and load current carrying switch contacts with the bender-type switching device are connected across the applied alternating current source in advance of the input network.

Still a further feature of the invention is the provision of zero crossing synchronous AC switching circuit having the above-described features wherein the load being supplied is essentially resistive in nature and the voltage and current zero crossings are substantially in phase and occur substantially concurrently in time.

A still further feature of the invention is the provision of zero crossing synchronous switching circuits having the above-described characteristics for use with loads that are reactive in nature and the current zero crossings either lag or lead the voltage zero crossings in phase and time of zero crossing. The zero crossing synchronous AC switching circuit includes both voltage and current zero crossing sensing circuit means and the energizing potential control circuit means includes logic circuit means responsive to the voltage zero crossing and current zero crossing timing signal and the user operated switch means for processing and utilizing the voltage zero crossing and current zero crossing timing signals to derive output electric energization potential for selective application and removal from the bender member of the piezoelectric ceramic bender-type switch device in response to the user operated switch means.

A still further feature of the invention is the provision of zero crossing synchronous AC switching circuits as described above wherein the phase shift circuit means includes two separate phase shift circuits providing different phase shift intervals. The circuit also includes respectively connected steering diode means for interconnecting one of the phase shift circuit means in effective operating circuit relationship in the zero crossing synchronous AC switch during energization of the piezoceramic switching device bender member to close the load current carrying switch contacts and thereby provide load current flow after a first preselected phase shift interval, and for interconnecting the other of the phase shift circuits in effective operating circuit relationship during removal of energization potential from the bender member to thereby effect opening of the load current carrying switch contacts and terminate load current flow after a second different preselected phase shift interval. The two different phase shift intervals are provided in order to accommodate different phenomena effecting the switch contact closure and opening, respectively.

A still further feature of the invention is the provision of zero crossing synchronous AC switching circuits having the above-described features wherein the energizing potential control circuit means includes means for initially impressing a relatively lower voltage electric energizing potential across the bender member of the piezoelectric ceramic switching device and load current controlled bender voltage control means responsive to low initial values of load current flow through the load current carrying contacts of the switching device for subsequently increasing substantially the voltage value of the energizing potential applied to the bender member to a relatively larger value to enhance contact closure and reduce contact bounce and increase contact compressive force after initial contact closure.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIGS. 1 and 1A through 1D are a series of voltage and current versus time waveshapes which depict certain voltage operating characteristics expected to be encountered upon placing a circuit designed according to the invention in service together with a depiction of the optimum zero crossing "window regions" during which it is desired that the circuit function to open or close the load current carrying switch contacts;

FIGS. 2 and 2A through 2E depict an idealized voltage versus time waveform and possible resultant current versus time waveforms having perturbations imposed thereon which have been introduced as a consequence of conditions under which the circuit must be capable of operating reliably;

FIGS. 3, 3A and 3B disclose a series of voltage versus time waveform and corresponding load current carrying contact closure and opening times of a switching circuit constructed according to the invention;

FIGS. 8 and 8A through 8D illustrate a series of voltage and current versus time waveform that results from imposition of a varying reactive load on an alternating current supply potential and illustrates preferred timing intervals and how they are achieved during current zero crossings in accordance with the invention under such conditions;

FIG. 10 is a simplified block diagram of a piezoceramic bender operated switch device operated according to the invention for use in interpreting the current, voltage and timing waveform signals depicted in FIGS. 10A through 10K;

FIG. 11 is a detailed schematic circuit diagram of a novel piezoelectric ceramic bender-type switching device bender member energizing potential control circuit made available by the invention; and FIGS. 11A through 11D are voltage and current waveshapes depicting the operation of the bender member energizing potential control circuit shown in FIG. 11.

BEST MODE OF PRACTICING THE INVENTION

Figure 4:
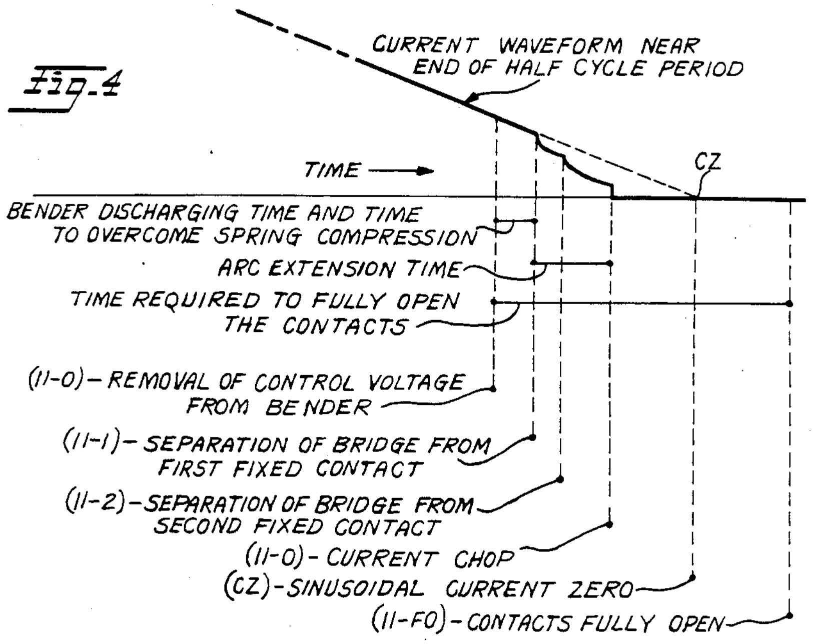
FIGS. 4 and 4A through 4C depict greatly magnified views of a current versus time waveform as it would naturally occur with superimposed current conditions imposed by the opening of the switch contact system at or near to the naturally occurring current zero.

FIG. 1 of the drawings illustrates three different waveshapes depicting the voltage versus time characteristics of three alternating current voltages having peak voltage values of 130 volts, 95 volts and 15 volts, respectively. From a review of FIG. 1, it will be observed that while each of the voltage waveshapes have different peak voltage values, they all cross through zero value at substantially the same point. In the case of zero crossing synchronous AC switching circuits employing semiconductor switching devices, because of the substantially instantaneous turn-on and turn-off characteristics of such semiconductor switching devices, a circuit such as that described in U.S. Pat. No. 3,381,226—issued Apr. 30, 1968 can appropriately be used in switching applications wherein the applied alternating current may have peak voltage values extending between the wide range of values depicted in FIG. 1 or even over a greater range of values. FIG. 2 of U.S. Pat. No. 3,381,226 illustrates a typical voltage versus time waveshape for an alternating current supplying a resistive load and shows at the respective zero crossings of the voltage waveshape acceptable limits within the region of the zero crossing wherein the zero crossing switching effectively can be achieved. These limits are shown to be within + and −2 volts on each side of the zero crossing measured with respect to the voltage value of the applied alternating current and within + or −1 degree of the zero crossing measured with respect to the angular phase of the applied alternating current voltage. These limits define acceptable "windows" within which a properly constructed zero crossing synchronous AC power semiconductor switching circuit can achieve the benefits associated with zero crossing synchronous AC switching as explained more fully in the above-referenced U.S. Pat. No. 3,381,226, the disclosure of which is hereby incorporated into this application in its entirety. Most power semiconductor switching devices have a turn-on time of roughly several microseconds up to hundreds microseconds for the higher power rated devices and commutation turn-off times of comparable time duration. Thus, it will be appreciated that the relatively narrow zero crossing "window" within which zero crossing synchronous AC switching can be achieved, as defined in U.S. Pat. No. 3,381,226, is quite acceptable for all but the very largest power rated switching semiconductor devices which require arrays of individual semiconductor devices to be gated-on or off in predetermined sequences, and even these seldom require switching times that extend into the millisecond region.

In contrast to power semiconductor switching devices, a piezoelectric ceramic bender-type switching device may require a charging time of several milliseconds to effectively charge the piezoelectric ceramic plate element comprising a part of the bender member of the switching device to a sufficient voltage to cause it to move the bender member and close a set of load current carrying switch contacts that also comprise part of the piezoceramic switching device. Assuming for the sake of discussion that the time required to charge the piezoceramic plate element of a bender-type switching device is of the order of 1 or 2 milliseconds, and that in a 60 hertz alternating current wave there are 8.3 milliseconds in each half cycle of the wave between the zero crossings, then it will be appreciated that a 1 or 2 millisecond charging time extends substantially further out in the phase of an applied alternating current voltage so as to be substantially effected by different peak voltage values of the applied alternating current as depicted in FIG. 1. This is in contrast to power semiconductor switching devices whose turn-on and turn-off response times are of the order of only a few hundred microseconds or less. Thus, it will be appreciated that an acceptable "window" for turn-on and turn-off of a piezoceramic bender-type switching device must be designed into a suitable zero crossing synchronous AC switching circuit and is quite dependent upon the nature of the supply alternating current potential and in particular the peak voltage values expected to be used with any particular circuit design. A properly constructed zero crossing synchronous AC switching circuit according to the invention, however, would be designed to accommodate as wide variations in peak voltage values of an applied alternating current potential as is feasible in the light of the physical characteristics of piezoceramic bender-type switching devices.

In view of the above discussed design considerations, it is essential that a properly designed zero crossing synchronous AC switching circuit employing a piezoceramic bender member have the energizing potential applied to the bender member well in advance of the zero crossing as depicted in FIG. 1A of the drawings. In FIG. 1A, which is intended to depict a circuit according to the invention designed for nominal peak voltage values extending from 110 to 230 volts at a frequency of 60 hertz, it will be seen that application of the leading edge of the bender energizing potential to the bender member shown at 11 leads the naturally occurring current zero by a predetermined angular phase interval related timewise to a 2 millisecond charging period required to charge the capacitance of the piezoceramic bender member to a sufficient value to cause it to bend and close the load current carrying contacts of the switching device either at the naturally occuring current zero or as near thereto as possible. It should be noted that the "window" 11, 11' within which successful zero crossing synchronous AC switching can be achieved does not necessarily have to occur precisely at the zero crossing, but can even lag the zero crossing by a finite time period of the order of a millisecond or less and still achieve proper switching action. It is preferred however that actual contact closing be ahead of the zero crossing for best performance of the switch expecially where the inherent bounce in switching contacts will usually cause multiple arcs and contact erosion.

FIG. 1B of the drawings illustrates what happens in the event that actual switch contact closure occurs too late after the zero crossing where the tailing end of the zero crossing "window" shown at 11' occurs at a point where the alternating current voltage value has built up substantially in advance of initial contact closure. Under these conditions, current flow at contact closure can be so large as to cause welding at any point during the remainder of the succeeding half cycle of the alternating current wave and severe erosion of the contact surface can result.

FIG. 1C of the drawings illustrates preferred positioning of the zero crossing window under conditions where load current carrying switch contacts are opened with the zero crossing switching circuit. Here again, it is preferred that opening of the switch contacts leads the naturally occurring zero crossing by a substantial amount in order to assure that current extinction across the contacts occurs at or as near to the first naturally occurring zero crossing as possible. Here again, the trailing edge of the window shown at 11' may lag the naturally occurring zero crossing by only a slight amount at the time of current extinction. However, as shown in FIG. 1D, if the trailing edge of the zero crossing window 11' occurs too late in the succeeding alternating current half cycle, the current and voltage will have built up to too substantial a value to allow an arc that is created between the load current carrying contacts as they separate to be extinguished until the next naturally occurring current zero. As a result, considerable wear and tear on the contact surfaces will occur due to the continuous arcing over the remainder of the succeeding half cycle until the next commutation zero crossing occurs.

From the foregoing discussion, it will be appreciated that practical sizing and phase positioning of the zero crossing window 11, 11' required for successful zero crossing synchronous AC switching using piezoceramic bender-type switching devices is required if stability and reliability during operation is to be achieved together with longevity of operating life in service.

FIG. 2 of the drawings illustrates an idealized voltage versus time sinusoidal waveshape which hardly ever occurs in nature, but which nevertheless is the ideal voltage versus time waveform sought to be achieved in supplying alternating current excitation potential to switching devices of the type under consideration. FIG. 2A illustrates what in fact can happen in the real world of switching devices used in residential, commercial and industrial environments in regard to the nature of the supply excitation potential supplied to such devices. This same comment also is true with respect to FIGS. 2B–2E. In FIG. 2A, a supply excitation potential starts with the ideal waveform illustrated in FIG. 2, but half way through a half cycle a severe interruption 12 occurred on the transmission line supplying the voltage which produces a steep decrease in voltage known as a voltage spike having high rate of change of voltage with respect to time (high dv/dt). In the case of gated power semiconductor switching devices, this high dv/dt voltage spike applied across its load terminal will appear as a gating turn-on pulse 12' reproduced in curve 2A(2) below the voltage spike 12 in FIG. 2A(1). If a gatable power semiconductor device which initially is in its off current blocking condition is subjected to such a transient voltage spike, the device would be gated-on by the pulse 12' and rendered conductive so that load current shown by the remainder of the current waveform denoted I then unintentionally will be supplied to the load, perhaps with calamatous results. With a piezoceramic bender-type switching device of the type used in the circuits herein disclosed, wherein the load current carrying contacts in their off condition effectively present an open circuit gap ohmic resistance having an infinetly large resistance value of 10 ohms or greater, such an undesired turn-on effect could not be achieved upon the occurrence of such a voltage spike in the supply AC transmission lines.

FIGS. 2B–2C show other forms of supply voltage and current perturbations which seriously can effect operation of switching devices and with respect to which the switching device constructed according to the invention must be designed to accommodate.

FIG. 2B of the drawings illustrates what happens to the AC supply line voltage in the event that a phase control device such as a light dimmer is used on the same AC supply transmission line that supplies a switching current according to the invention. In FIG. 2B, it is seen that a substantial voltage dip shown at 13 occurs in the supply line AC voltage waveshape during each cycle or half cycle thereof at the point where the phase control device turns-on and supplies a portion of the cycle or half cycle supply current to a light or other apparatus being controlled via the dimmer switch phase control device. As illustrated in FIGS. 2C and 2D, the sharp voltage dip 13 produced by operation of the phase control device on the same AC voltage supply transmission line can move around with respect to its location in the phase of the supply alternating current potential dependent upon the nature and setting of the phase control device. As illustrated in FIG. 2D it even can occur at or close to the naturally occurring zero crossing of the AC voltage wave. See, for example, an article entitled "Evaluation of Mains-Borne Harmonics Due to Phase-Controlled Switching"—by G. H. Haenen of the Central Application Laboratory—Electronic Components and Material Produce Division, N.V. Philips Gloeilampenfabrieken, Eindhoven, The Netherlands. This type of perturbation appearing upon the supply alternating current voltage applied to a switching circuit constructed according to the invention also must be accommodated by the circuit without false turn-on or turn-off as can occur with semiconductor switching devices discussed earlier with respect to FIG. 2A of the drawings.

FIG. 2E of the drawings shows still another distorted alternating current waveshape that can appear in supply alternating current potential sources and wherein harmonic distortion illustrated in FIG. 2 as a higher frequency undulating wave superimposed on the fundamental frequency of the supply alternating current potential, is present. Such harmonic distortion can be produced, for example, at the output of an inverter circuit power supply that operates to convert direct current electric potential into an alternating current electric potential of a desired fundamental frequency such as 60 hertz. In such power supplies, the inverter circuit may operate at a substantially higher frequency than the fundamental frequency and its output summed together to produce the desired output fundamental frequency having superimposed thereon harmonic distortion characteristics as shown in FIG. 2E. Zero crossing synchronous AC switching circuits employing piezoceramic bender-type switching devices according to the invention also must be able to accommodate operation with supply AC voltage waveshapes possessing harmonic distortion characteristics as illustrated in FIG. 2E.

In order to accommodate the above-discussed expected variations appearing in normal alternating current power supplies, the present invention is designed so that it will apply bender excitation potential to the bender member of the piezoceramic bender-type switching device at a point in the phase of the supply alternating current shown at 11C in FIG. 3(1) and the bender member closes at or prior to a point 11C' to establish current flow through the switch contacts as shown in FIG. 3(2) at 11C'. The load current carrying contacts thereafter will remain closed and supply load current until it is desired to terminate load current flow. At this point, bender excitation potential is removed from the bender piezoceramic plate element so that it starts to open at 11-0 as shown in FIG. 3(1) and actually interrupts current flow at 11-0' as shown in FIG. 3(2). The sequence of events that occur is shown in greater detail in FIGS. 3A, 3B, 3C and 3D which are juxtaposed one under the other with appropriate legends. As shown in FIGS. 3B and 3C, the application of excitation voltage to the bender preceeds movement of the load current carrying switch contacts to start closure by a finite time determined by the RC charging time constant required to charge the capacitance of the bender member piezoceramic plate element to a sufficient voltage value to cause it to start to bend and close the switch contacts. In a similar fashion, the actual physical bending of the bender member to fully close the contact also requires a finite time illustrated in FIG. 3B. At this point load current starts to flow to the load through the switch contact. Assuming the load to be a purely resistive load then the voltage and current are substantially in phase as shown in FIG. 3D.

At a point in time when it is desired to discontinue load current flow, the bender member excitation voltage is removed from the bender member as shown in FIG. 3C. Here again, it will be seen that there is a finite time period required for the charge on the piezoceramic plate element capacitor to leak off sufficiently to cause the bender member to start to open the contacts as will be seen from a comparison of FIGS. 3C to 3D. This finite time period will be somewhat longer than that required to initially charge the capacitor as will be seen from a comparison of FIG. 3C timing to apply bender volts on to the timing where the bender volts are removed (off). Subsequently, after discharge of the bender member to a sufficiently low voltage value, the bender member starts to open the contact as shown at 11-0 in FIG. 3B and the contacts are open at 11-0' at which point current flow through the switch contacts is extinguished as shown in FIG. 3D.

FIGS. 4, 4A, 4B and 4C illustrate in even greater detail the physical and electrical phenomena occurring in the region of contact opening to interrupt current flow through the load current carrying switch contacts. In FIGS. 4, 4A, 4B and 4C the naturally occurring sinusoidal current zero is shown at CZ. The point of removal of the energization control voltage from the bender piezoceramic plate element is shown at 11-0 conforming to the same point shown in FIGS. 3A–3D. The current waveform shown in FIG. 4 corresponds to that obtained with a contact system using bridging contacts wherein a movable bridging conductive bridge member moves to close on two fixed contacts to short circuit the contacts to initiate current flow and thereafter selectively is moved away from short circuiting position to interrupt current flow through the contacts. In any such bridging contact arrangement, movement of the bridging contact member away from the closed position to interrupt current flow will separate the bridging member from one or the other of the fixed contacts prior to separation from the other fixed contacts. Such a bridging contact arrangement is illustrated by the waveform shown in FIG. 4 so that separation of the bridging member from the first fixed contact is shown at 11-1. Separation of the bridging member from the second fixed contact is shown at 11-2. From FIG. 4 it is seen that the load current continues at its established normal sinusoidal level between the time 11-0 when the control energizing bender potential was removed to 11-1 where separation of the bridge member from the first fixed contact occurs. In the time interval between 11-1 and 11-2 when the first bridge contact is separated from the bridging member, the current through the contact is reduced slightly due to an arc between the movable bridge and the first contact, and thereafter it is reduced at a greater rate after point 11-2 following separation of the bridge from both the first and second fixed contacts. The period of time extending between 11-2 and 11-0' is the period of time that an arc exists in the space separating both the first and second fixed contacts from the movable bridging member. At the point where the voltage and current waveform nears the naturally occurring sinusoidal current zero CZ, the voltage across the separated switch contacts is no longer sufficient to maintain the arc as shown at the point 11-0' where current extinction occurs and is identified as current chop. Subsequent to current chop, the current will remain at zero but the applied alternating current voltage will pass through the naturally occurring sinusoidal voltage and current zero as is normal for resistive loads and will reappear as an increasing reverse polarity potential across the now open switch contacts. In order to withstand this reverse applied potential, the voltage withstandability of the switch contacts is increased by the bender member continuing to separate the movable bridging member from the fixed contacts by continuing to drive the movable bridging member to its fully opened position shown at 11-FO.

Figure 4A:
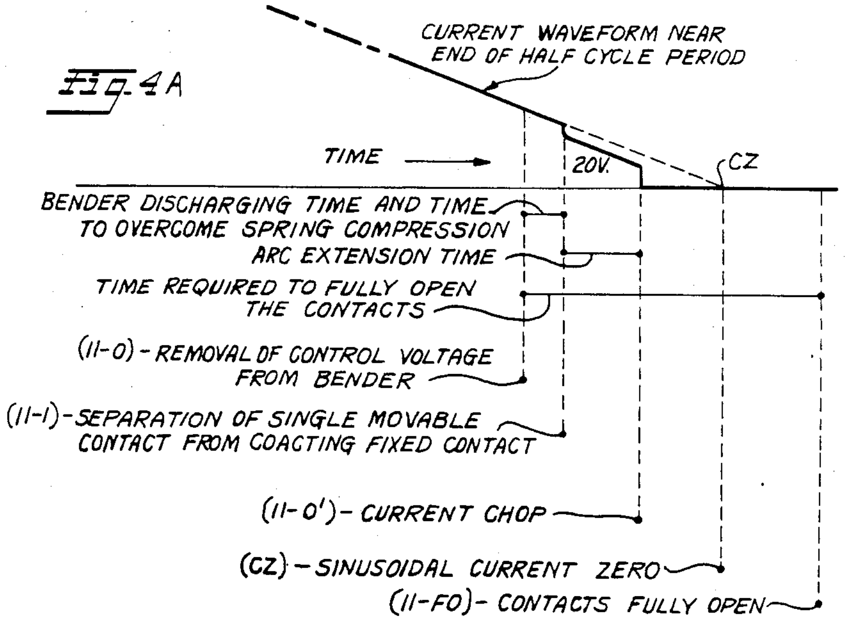

FIG. 4A illustrates the conditions occurring where the load current carrying switch contacts of the piezoceramic bender-type switching device are comprised by a single fixed contact and a single movable contact which have been closed previously to initiate current flow and later opened to interrupt current flow. With a switching device of this nature, to initiate opening the control energizing potential applied to the bender member is removed at point 11-0 well in advance of the naturally occurring current zero CZ. At point 11-1 the single movable contact separates from the coacting fixed contact. The time between points 11-0 and 11-1 are the times required for the bender to discharge sufficiently to be overcome by the bender member spring compression to start to open. At point 11-1, upon separation of the movable contact from the fixed contact, it will be seen that the load current suddenly decreases in value but is sustained by the existence of an arc until the point 11-0' where current chop occurs and the current is interrupted well in advance of the sinusoidal current zero point CZ. Here again, the continuing discharge of the bender member after removal of the controlled energization potential continues to cause the bender member to move away in a direction to further separate the switch contacts and thereby improve their voltage withstandability as shown at 11-FO. The current extinction phenomenon illustrated in FIG. 4A depicts what occurs when the point 11-1 where the contacts start to separate is at a point in the phase of the applied alternating current voltage where more than approximately 20 volts exists across contacts as they start to open. Under these conditions, a stable arc will be produced in the space between the opening contacts which will continue until current chop which corresponds to the point where the applied voltage across the separated contacts drops below approximately 20 volts. This is true of switch contact systems which are fabricated from silver bearing alloy materials and are operated in air.

Figure 4B:
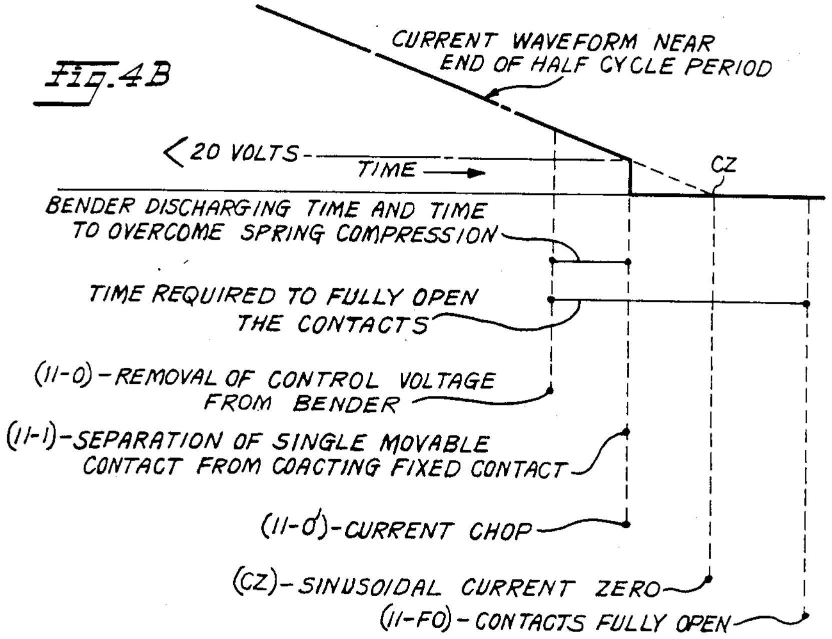

FIG. 4B of the drawings illustrates a condition where at the point of contact separation shown at 11-1 in FIG. 4B, the voltage across a separating set of silver alloy contacts is less than approximately 20 volts. As a consequence of this condition, current chop shown at 11-0' will occur simultaneously with initiation of contact separation and current flow through the contacts will be extinguished due to the fact that there is insufficient voltage existing across the contacts to strike a stable arc. From a comparison of FIG. 4B to FIG. 4A, it will be appreciated that it is particularly desirable to so design switching circuits according to the invention so that current extinction (current chop) occurs at or as near as possible to the naturally occurring sinusoidal current CZ. This is true for a number of reasons, the most important of which is that if current chop occurs at voltage or current values below which it is not possible to sustain a stable arc current, then no arc will be produced between the separating contacts and wear and tear on the contacts is reduced.

Figure 4C:
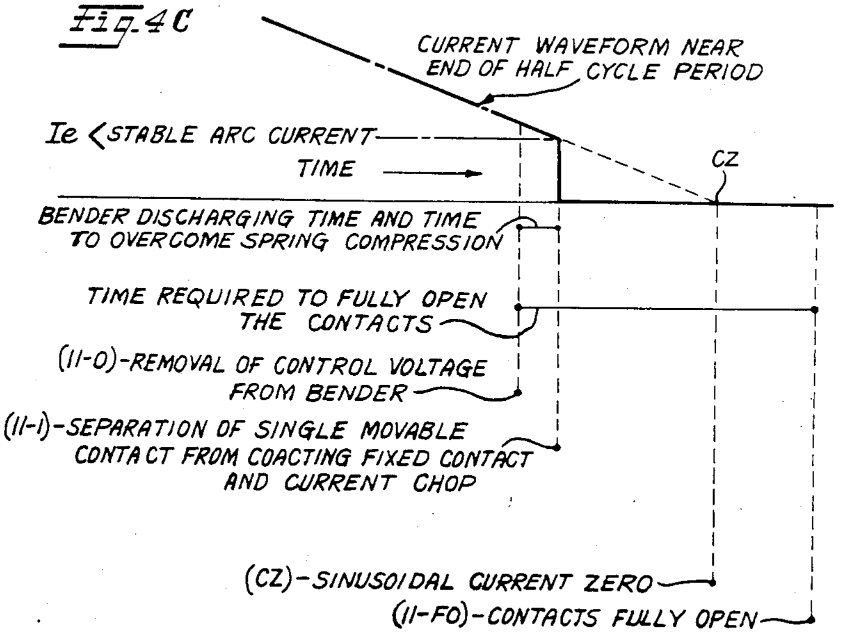

FIG. 4C depicts a more generalized version of the current extinction phenomenon illustrated in FIG. 4B. In FIG. 4C, the switching circuit is designed such that separation of the contacts at 11-1 occurs at a current value Ie which is below a stable arc holding current value for the particular material out of which the switch contacts are fabricated. If thus operated, current extinction (current chop) occurs simultaneously with separation of the switch contacts so that no arc current is produced and the wear and tear on the contacts is minimal or non-existent. Selected examples of materials whose material dependent values of Ie are as follows: molybdenum (Mo) whose Ie is typically less than 16–20 amperes, copper whose Ie is typically less that 6–10 amperes and cadmium whose Ie is less than 1–3 amperes. The advantage obtained from using materials having a low Ie is that for purely resistive loads as depicted in FIGS. 4–4C, the applied voltage will be correspondingly lower and the probability of restriking an arc after opening of the contacts is reduced. This adds further reason for designing a switching device to obtain current extinction (current chop) at or as near to the naturally occurring sinusoidal current zero as possible.

The above considerations point to the use of contact materials which have both low stable arc current values Ie and high voltage withstandability to prevent restriking an arc after current extinction with the contacts separated and open. One family of known contact materials having both these desirable characteristics is formed from copper/vanadium alloys as described in co-pending U.S. application Ser. No. 399,669 entitled "Electrode Contacts for High CUrrent Circuit Interruption", filed July 22, 1982, by George A. Farrall, inventor, and assigned to the General Electric Company. Accordingly, in preferred embodiments of the invention the load current carrying switch contacts 18, 19 for higher power rated devices may be fabricated from copper/vanadium alloys.

Figure 5:
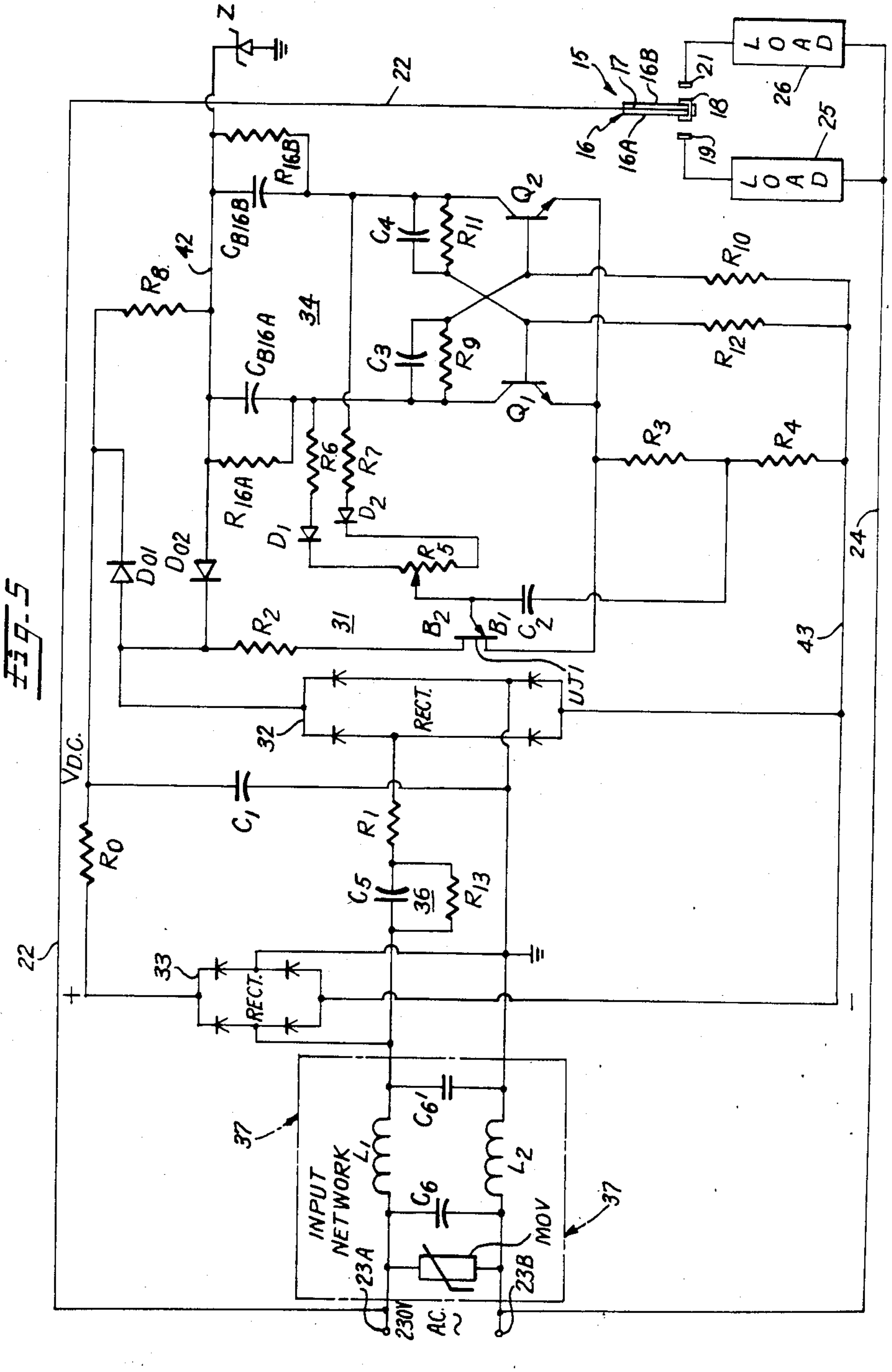
FIG. 5 is a detailed schematic circuit diagram of a novel zero crossing synchronous AC switching circuit constructed according to the invention.

FIG. 5 is a detailed schematic circuit diagram of an improved zero crossing synchronous AC switching circuit constructed according to the invention. The circuit shown in FIG. 5 includes a piezoelectric ceramic bender-type switching device 15 which is similar in construction to the bender-type switching device shown and described with relation to FIG. 8 or FIG. 9 in co-pending U.S. application Ser. No. 685,109 or FIG. 5 or FIG. 8 of U.S. patent application Ser. No. 685,108. The piezoceramic bender-type switching device 15 is comprised by a bender member 16 fabricated from two piezoelectric ceramic plate elements 16A and 16B sandwiched together over separate central conductive surfaces 14U and 14L and having outer conductive surfaces (not shown) comprising an integral part of the plate elements 16A and 16B. Bender member 16 further includes a contact surface 18 formed on the movable end thereof which is designed upon bending to contact and close an electrical circuit through fixed contacts 19 or 21, respectively, depending upon the direction in which bender member 16 is caused to move. Bender member 16 is clamped at the opposite end thereof by clamping means (not shown). For a more detailed description of the construction and operation of the piezoelectric ceramic bender-type switching device 15, reference is made to the above-noted co-pending U.S. application Ser. No. 685,109 and/or U.S. application Ser. No. 685,108.

The central conductive surface 17 of bender member 16 is electrically connected at one end to the movable outer contact 18 at one end thereof and at its clamped end is electrically connected to a terminal bus bar conductor 22 whose remaining end is directly connected to an input terminal 23A supplied from an input 230 volt alternating current source of electric potential. The remaining input terminal 23B of the alternating current supply source is connected back through a terminal bus bar conductor 24 to one input terminal of a first load 25 and to one input terminal of a second load 26. The remaining input terminal to the loads 25 and 26 are connected respectively to the fixed contacts 19 and 21 of the piezoceramic bender-type switching device 15. From the above-described electrical interconnections, it will be appreciated that when the bender member 16 is caused to bend to its left as viewed by the reader to close movable contact 18 on fixed contact 19, load current will be supplied to the load 25. Alternatively, if bender member 16 is caused to move to its right to close movable contact 18 on fixed contact 21, load 26 will be supplied with load current.

In order to selectively energize the plate elements 16A and 16B of bender member 16 at or close to the zero crossing of the applied alternating current potential pursuant to the considerations set forth above relative to FIGS. 1–4C of the drawings, zero crossing sensing circuit means shown generally at 31 are provided in the circuit of FIG. 5. The zero crossing sensing circuit means 31 is comprised by a full wave rectifier 32 having one of its output terminals connected through a diode DO1 to the positive terminal of a high voltage direct current source comprised by a second full wave rectifier 33, a resistor capacitor filter network R1C1 and a voltage limiting zener diode Z. The remaining output terminal of zero crossing full wave rectifier 32 is connected through a negative terminal conductor 43 to the high voltage direct current fullwave rectifier 33. The zero crossing sensing circuit means 31 further includes a unijunction transistor UJ1 whose B2 base is connected through a resistor R2 to the positive terminal of zero crossing full wave rectifier 32 and whose B1 base is connected through voltage limiting resistors R3 and R4 in series to the negative DC voltage terminal bus bar conductor 43. The emitter of unijunction transistor UJ1 is connected directly to the movable contact of a potentiometer R5 and via a timing capacitor C2 to the junction of the voltage limiting resistors R3 and R4.

To insure that pulses from the unijunction transistor UJ1 are produced only during the zero crossing interval of the alternating current potential applied to the input of zero crossing sensing rectifier 32, UJ1 is locked out and prevented from conducting at all other times during the cycle by a positive bias applied thereto via resistor R8 and diode DO2. However, lock out of UJ1 during most of the AC cycle does not prevent the continuous application of an energization potential across one or the other of the piezoceramic plate elements 16A or 16B whose capacitances are illustrated in the circuit of FIG. 5 by the capacitors CB16A and CB16B, respectively, and which are discharged when not being energized through high resistance discharge resistors R16A and R16B, respectively. During most of the AC cycle applied to zero crossing sensing rectifier 32, the B2 base of unijunction transistor UJ1 will be clamped by essentially the DC potential appearing across the output of DC supply full wave rectifier 33 via diode DO1. However, in the zero crossing region, diode DO1 becomes blocking and diode DO2 allows base 2 of UJ1 to be drawn down to the VZ value which is clamped by zero diode Z. This allows the B2 base of UJ1 to assume a low value at a precise time relative to the line voltage zero crossings. This reduction in B2 voltage allows the unijunction transistor UJ1 to conduct and supply an output current pulse to turn-off either one or the other of the transistors Q1, Q2 comprising a part of the bender energization potential control circuit means, depending upon which one of the two is in its on (conducting) state. Immediately following the turn-off of Q1 by the UJ1 current pulse in R3-R4 that reverse biases the Q1 base emitter junction, Q2 will be turned-on by the rising voltage across C3 as Q1 turns-off. As Q2 turns-on the falling voltage across C4 aids in the turn-off of Q1. In like manner, when UJ1 again conducts Q2 will be turned-off and Q1 turned-on. This results in the bender 15 being alternately energized from left to right in synchronization with the AC line voltage zero crossings. Independent control of the charge on each bender element capacitor CB16A and CB16B is made possible by the insulatingly separated inner conductive surfaces (not shown) of the bender member which allow the bleeder resistors R16A or R16B to discharge whichever capacitor's associated charging transistor Q1 or Q2 is turned-off.

The production of an output pulse by the unijunction transistor UJ1 at any given zero crossing in the above-described manner is determined upon the state of charge of the timing capacitor C2. This in turn is determined by which steering diode D1 or D2 is effective to connect its timing resistor R6 or R7 in circuit relationship with a common potentiometer resistor R5 and thereby supply charging current to timing capacitor C2. Thus assuming for example that transistor Q1 is turned on and supplying energizing potential to the piezoceramic plate element 16A capacitor CB16A, then the steering diode D1 will have its anode drawn down so that it becomes blocking and only diode D2 can then supply charging current through its timing resistor R7 and potentiometer R5 to the charging capacitor C2. The reverse is true of course if Q2 is conducting and Q1 blocking.

The two transistors Q1 and Q2 form a bistable flip-flop circuit that comprises a bender energizing potential control circuit means shown generally at 34 which is responsive to the zero crossing timing signal produced by UJ1 for selectively applying or removing an energizing potential across the piezoceramic plate elements 16A or 16B, alternately. Essentially independent adjustment of transistor Q1 and Q2 conduction times both of which extend over many cycles of the supply AC voltage source, is achieved via steering diodes D1 and D2 and their respectively connected timing resistors R6 and R7. By employing one common timing potentiometer R5, the switching system provides a substantially constant period with a wide range of time ratio adjustments for the percentage of time during which movable contact 18 is closed on fixed switch contact 19 and vice versa.

The bender energization potential control circuit 34 means comprised by the astable flip-flop circuit Q1 and Q2 has the collector electrodes of transistors Q1 and Q2, which are NPN bipolar transistors, connected directly to one plate of each of capacitors CB16A, CB16B, respectively, formed by the piezoceramic plate elements 16A and 16B. A common voltage limiting resistor R8 is connected to the remaining plates of capacitors CB16A and CB16B and is supplied from the positive terminal of the high voltage DC source comprised by full wave rectifier 33 filter circuit R1C1. By this arrangement, the energizing potentials applied to the prepolarized piezoelectric plate elements 16A and 16B of bender member 16 always will be of the same polarity as the polarity of the prepolarization potentials used to initially prepolarize the bender plate elements. The emitter electrodes of transistors Q2 are connected via the series connected limiting resistors R3 and R4 to the negative terminal conductor 34 of the high voltage DC source 33. Feedback coupling from each of the transistors Q1 and Q2 between the collector and bases thereof in order to assure astable flip-flop operation, is provided by feedback capacitors C3 and C4 together with resistors R9 and R10 and resistors R11 and R12, respectively. With this arrangement, capacitor C3, resistor R9 and resistor R10 feedback the voltage appearing on the collector of transistor Q1 to the base of transistor Q2 to cause Q2 either to turn-on or turn-off depending upon the conducting state of the opposite transistor Q1. Similarly, C4, R11 and R12 couple potential on the collector of Q2 back to the base of Q1 so that either one or the other is conducting or vice versa but neither is allowed to conduct simultaneously, therey forming a bistable circuit which changes state whenever UJ1 timing circuit 31 delivers an output pulse to R3 R4. While Q1 is conducting piezoelectric plate element 16A of bender 16 is energized so as to close movable contact 18 on fixed contact 19 and supply load current flow through the load 25. Conversely, with Q2 conducting and Q1 blocking, load 26 is supplied with load current.

The novel zero crossing synchronous AC switching circuit shown in FIG. 5 is completed by phase shift circuit means shown generally at 36 and is comprised by a capacitor C5 having a resistor R13 connected in parallel circuit relationship across it with the parallel circuit thus formed being connected in series with a resistor R14 between the input of the zero crossing detector 32 and the AC supply input terminals 23A and 23B. The phase shift circuit means 36 is designed so as to introduce a leading phase shift of the zero crossing timing signal pulses produced by the rectifier 32 and unijunction transistor UJ1 in advance of the naturally occurring zero crossings of the supply AC source. Hence, energization potential applied by the bender energizing potential control circuit means 24 by either of the transistors Q1 or Q2 in response to the zero crossing timing signal pulses always occurs well in advance of the naturally occurring zero crossing sinusoidal AC signal being applied via switch contacts 18–19 or 18–20 to the loads 25 or 26 pursuant to the consideration set forth in the above discussion relating to FIGS. 1–4.

To further enhance performance of the zero crossing synchronous AC switching circuit shown in FIG. 5, an input network shown generally at 37 is provided and comprises a metal oxide varistor voltage transient suppressor MOV connected across the input terminals 23A and 23B. The input network 37 further includes a filter network comprised by conductors L1 and L2 and capacitors C5 and C6 connected across the input terminals 23A and 23B in the manner shown in series with the MOV voltage suppressor with the network being connected intermediate the input terminals 23A and 23B and the input to the zero crossing sensing circuit means 31. The provision of the smoothing input network 37 at this point in the circuit will help smooth many of the perturbations normally appearing in a supply alternating current voltage applied to the inputs 23A and 23B as discussed with relation to FIGS. 2 and 2A through 2E in particular. Additionally, it should be noted that the AC terminal bus bar conductor means comprised by conductors 22 and 24 for connecting the piezoceramic switching device 15 and loads 25 and 26 across the AC supply input terminals, are connected to the AC supply input terminals at interconnection points in advance of both input network 37, phase shift network 36 and the zero crossing sensing circuit means 31. By thus arranging the load circuit supply interconnections, the switching noises introduced on the line will have minimal effect on the logic functions being formed by the zero crossing sensing circuit means 31.

If the DC voltage supply which energizes the bender capacitances CB16A and CB16B is maintained constant by zener diode Z and if the bender capacitance and charging resistances are constant then the electrical time constants, (i.e., the product of RC), will be uniform from one operation cycle to the next over long periods of usage. However, because of timing changes in the AC supply voltage, time as a reference per se cannot be used. Zero crossing detection is more reliable for the reasons discussed with relation to the diagrams of FIGS. 1–4C showing distortion and notching as well as other perturbations in real AC supply sources. A literature reference by Siemens entitled "Application of Piezo Ceramics in Relays" published in 1976 in a journal called "Electrocomponent Science and Technology" indicates that temperature variation of piezoceramic plate element capacitors that are fabricated from lead zirconate titanate piezoceramic material typically used in benders shows only a + or $-2\frac{1}{2}\%$ change with a temperature change from $-5$ degrees Centigrade to $+60$ degrees Centigrade. The resistor values can be without temperature variation or can be with selected positive or negative coefficients depending on the precision in timing desired. In addition to these variations, it is necessary to add the variations induced with age both of the capacitance value of the bender and the mechanical system in terms of number of operations, etc. The changes due to aging of the capacitor material should not exceed an amount of the order of + or $-10\%$ over at least a 10 to 20 year operating life after the initial log decade degradation which is well documented in material handbooks. Therefore, it can be seen that for purposes of a realistic "window region" definition, the electrical response RC time constants with a simple bending member can provide reliable response within the "window regions" created by the energization control circuits. This is very difficult to do with electromagnetic relays. For example, over the same temperature range cited above, copper resistance will change by an amount of the order of at least 2 to 1. This means that the drive currents and the heating and the power supply perturbations all increase the difficulty in stabilizing magnetic circuit material changes with temperature and time and is coupled with detrioration due to mechanical hammering during opening and closing on the hinge assemblies since they do not involve simple bending.

In order to alleviate the constant response time required of the RC timing systems employed in the bender excitation control circuits, it may also be possible to use that timing in order to provide a slower closing of the switch contacts 18, 19 by the bender member 16 whereby the inertia of the system is greatly reduced and the "window regions" will be made wider. Such a timing system will not be as precise, but on the other hand, since there will be greatly reduced bouncing due to the slower bender speed, the amount of arcing and restriking will be significantly reduced. This may give rise to an acceptable trade-off between high speed precision switching in a narrowly defined zero crossing "window region" and less wear and tear on the contacts made possible by slower and softer movement of the bender within a more widely defined zero crossing "window region". FIG. 11 of the drawings illustrates a compromise between these two extremes by providing initial slow bender closure within a narrow window region to achieve precise switching with minimal contact bounce as will be described later with relation to FIG. 11.

Figure 6:
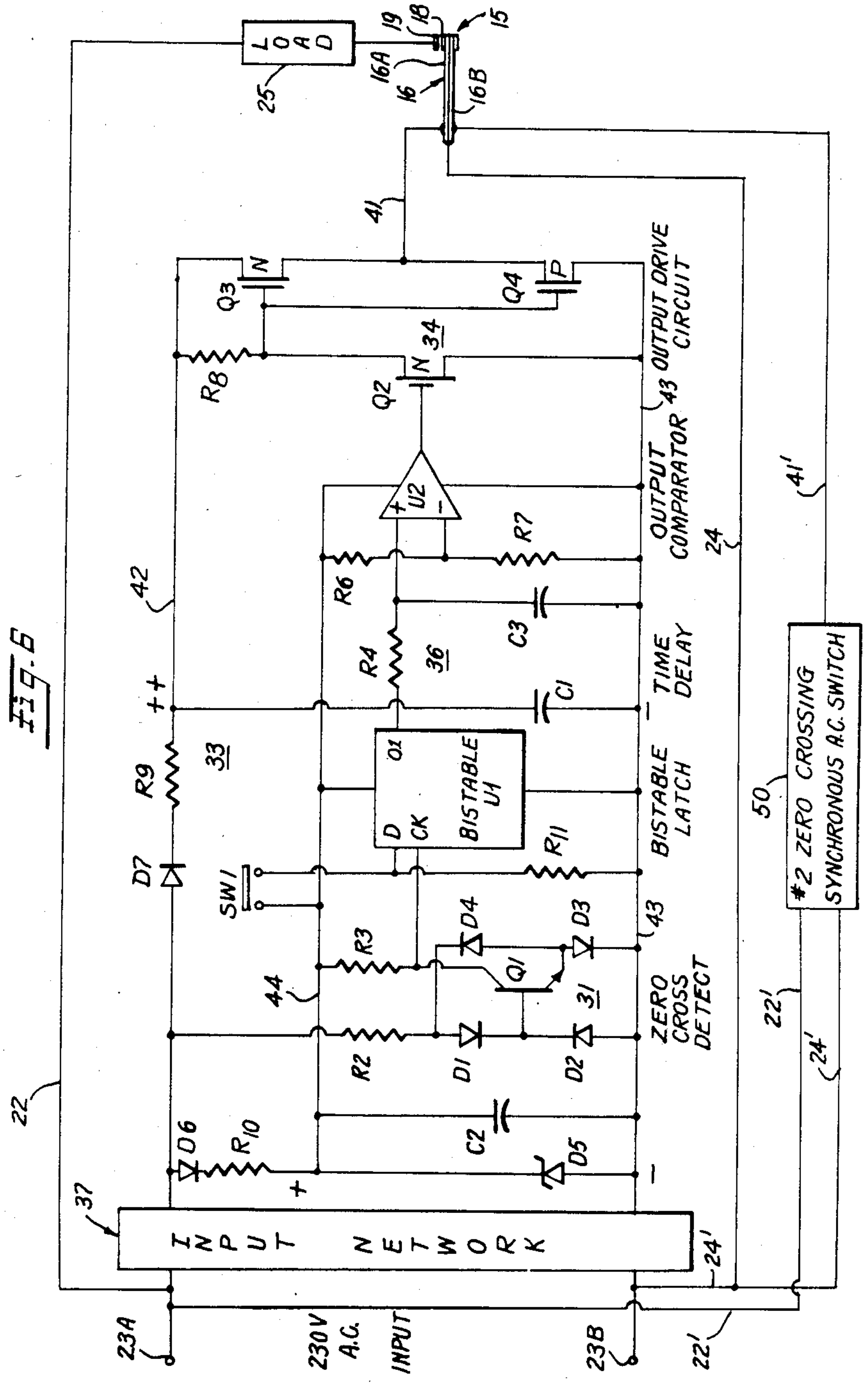
FIG. 6 is a detailed schematic circuit diagram of a different version of zero crossing synchronous AC switching circuit according to the invention for use with resistive loads.

FIG. 6 is a detailed schematic circuit diagram of another embodiment of the invention wherein a single piezoelectric ceramic bender-type switching device shown at 15 is employed to supply load current to a load 25 via the movable contact 18 formed on the movable end of the bender member 16 of switching device 15 and coacting with a fixed contact 19 to which a load 25 is connected. The load current carrying switch contacts 18 and 19 when closed connect load 25 across the output of a 230 volt AC voltage supply source via the input terminals 23A and 23B. Selectively applied energization potentials are applied to the upper plate element of bender member 16 via a conductor 41 supplied from the output from a bender energizing potential control circuit 34 to be described hereafter. The bender energizing potential is applied with the same polarity of the prepolarization potential used to initially prepolarize the prepolarized piezoceramic plate elements of the bender member 16.

The bender energizing potential control circuit 34 is in turn controlled by zero crossing timing signals supplied thereto from a zero crossing sensing circuit means shown generally at 31 via a phase shift circuit means 36 for introducing a preselected phase shift interval into the timing of the application of the bender energization potential to the bender member 16 measured relative to the naturally occurring zero crossing of the sinusoidal AC input voltage supplied to input terminals 23A and 23B. A relatively high direct current energizing potential for use by the bender energizing potential control circuit means 34 is provided by a diode rectifier D7 connected through resistor R9 across a filter capacitor C1 and applied via high voltage DC positive bus bar conductor 42 and negative conductor 43 across the bender energization potential control circuit 34 for selective application via conductor 41 to the upper bender plate element of bender member 16 as shown in FIG. 6.

A low voltage direct current potential is developed by diode D6, resistor R10 and capacitor C2 across a low voltage bus bar conductor 44. This low voltage DC potential is stabilized by a zener diode D5 for use by the signal level components comprising part of the zero crossing sensing circuit means 31 as a low voltage signal level DC excitation source.

The zero crossing sensing circuit means 31 is comprised by a set of series connected, opposed polarity diodes D1 and D2 connected in series circuit relationship with a voltage limiting resistor R2 across the alternating current output from the input network 37 ahead of the high voltage DC rectifier D7. The juncture of the cathode of diode D1 and the cathode of the diode of D2 is connected to the base of a bipolar NPN transistor Q1 whose collector electrode is connected through a resistor R3 to the low voltage DC positive bus conductor 44. The emitter of transistor Q1 is connected to the juncture of the anode of a second set of reverse polarity series connected diodes D3 and D4 connected in parallel circuit relationship across the first set of diodes D1 and D2 between the bottom of limiting resistor R2 and the negative polarity common bus conductor 43.

By the above arrangement, transistor Q1 is rendered conductive only at the zero crossings of the input alternating current supply voltage at points where its base is biased positively relative to its emitter via diodes D1 and D3. Hence, at the zero crossing points, Q1 will put out a series of zero crossing timing pulses that appear across resistor R3 and are applied to the CK clock input of a bistable latch U1. Bistable latch U1 is energized from the low voltage positive bus bar conductor 44 and in addition to the zero crossing timing clock signal pulses, has an enabling signal selectively applied to its D input terminal by a user operated switch SW1 via resistor R11. Bistable latch U1 may comprise any known commercially available integrated bistable latching circuit such as the dual type B flip-flop manufactured and sold commercially by the Motorola Company under the product designation MC14016B, and illustrated and described in a product specification booklet entitled "CMOS Integrated Circuits—Series C", third printing, copyrighted by Motorola, Inc. in 1978.

In operation, the bistable latch U1 upon the application of an enabling potential to its D input terminal from user switch SW1 simultaneously with the application of a zero crossing timing pulse to its CK input terminal, will produce a positive polarity output control signal at its O1 output terminal. This positive output control signal is supplied via phase shift cicuit 36 comprised by resistor R4 and C3 to the positive input terminal of a comparator amplifier U2. Similar to the FIG. 5 circuit, the phase shift circuit 36 introduces a phase shift interval relative to the zero crossings of the supply AC voltage, both with respect to the timing of the application of an energizing potential to the upper plate element 16A of bender member 16 and the timing of removal of such energizing potential, as will be explained more fully hereafter with relation to FIG. 10 of the drawings and its related waveshapes.

The comparator amplifier U2 may comprise any commercially available integrated circuit comparator such as the quad programmable comparator manufactured and sold commercially by Motorola, Inc. under the product identification number MC14574 and described in the above-noted specification sheet published by Motorola. The phase synchronized bender turn-on control signal from bistable latch O1 output terminal is supplied via phase shift circuit 36 to the positive input terminal of the U2 comparator amplifier. A reference signal derived from a voltage dividing network R6 and R7 connected across the low voltage direct current supply source 44-43, is applied to the negative input terminal of U2 for comparison to the bender excitation control signal. Upon the bender excitation control signal exceeding this reference input signal by a predetermined amount, a positive polarity turn-on signal will be supplied to an output drive amplifier circuit comprised by field effect transistors Q2, Q3 and Q4 which together with the output comparator amplifier U2 comprise the bender energization potential control circuit means 34 for controlling application of a relatively high voltage direct current energization potential across conductor 41 to the upper plate element 16A of bender member 16.

In operation, the zero crossing detector comprised by the diode network D1, D2, D3 and D4 senses the occurrence of the zero crossing of the input applied alternating current potential and via resistor R2 and transistor Q1 produces output zero crossing timing signal pulses that are applied to the clock input terminal CK of bistable latch U1. If user operated switch SW1 is open as shown in FIG. 6, bistable latch U1 will remain in its off condition wherein no positive polarity output potential appears at its O1 output terminal. Upon closure of switch SW1 by a user, an enabling potential is applied to the D input terminal of U1 which then causes bistable latch U1 to switch its operating condition and produce at output terminal O1 a positive polarity turn-on control signal simultaneously with the occurrence of one of the zero crossing timing pulses. This turn-on control signal is shifted in phase by phase shift network R4C3 by a preselected phase interval that corresponds in time to the time required to charge the upper piezoceramic plate element of bender member 16 together with sufficient time to accommodate any other perturbations occurring in the system, such as contact bounce, etc. Thus, in this operation the turn-on control signal from the output terminal of comparator U2 is caused to lead the naturally occurring zero crossings of the AC voltage being supplied through conductors 22 and 24 across load 25 and the switch contacts 19, 18 of the piezoceramic bender-type switching device 15. This leading turn-on control signal then is supplied to the FET output drive amplifier circuit comprised by FET transistor Q2, Q3 and Q4 which applies an energization potential through conductor 41 to the upper piezoceramic plate element of bender member 16. By thus advancing the charging time allowed for the bender plate element, the movable contact 18 will be caused to close on fixed contact 19 substantially at or close to a naturally occurring zero crossing of the sinusoidal AC supply voltage and supply load current flow through load 25 with minimal stressing of the switch 18, 19 contacts.

In certain switching circuit applications, it may be desirable or necessary to supply electric energizing potential to the reverse piezoelectric ceramic plate element 16B of bender 16 for a variety of different reasons. In the event of contact welding which can occur in any set of mechanically moved-apart switch contacts, it would be helpful if additional contact moving force can be applied to the bender member to aid its mechanical spring force in separating the contacts. In other circumstances it may be desirable to increase the forces acting on the bender to initiate contact separation or increase bender speed at some point in its travel early after separation to increase the gap rapidly for improved voltage withstand capability. For these purposes a second complete zero crossing synchronous AC switching circuit control shown at 50 which is similar in construction to FIG. 6 is added. The second control circuit 50 is connected in common to the same AC supply terminals 23A and 23B that the first circuit is connected to and has its output DC energizing potential applied over a conductor 41' to the lower piezoceramic plate element 16B. Here again, the polarity of the DC energizing potential will be the same polarity as that of the prepolarizing potential used to prepolarize piezoceramic plate element 16B.

Figure 7:
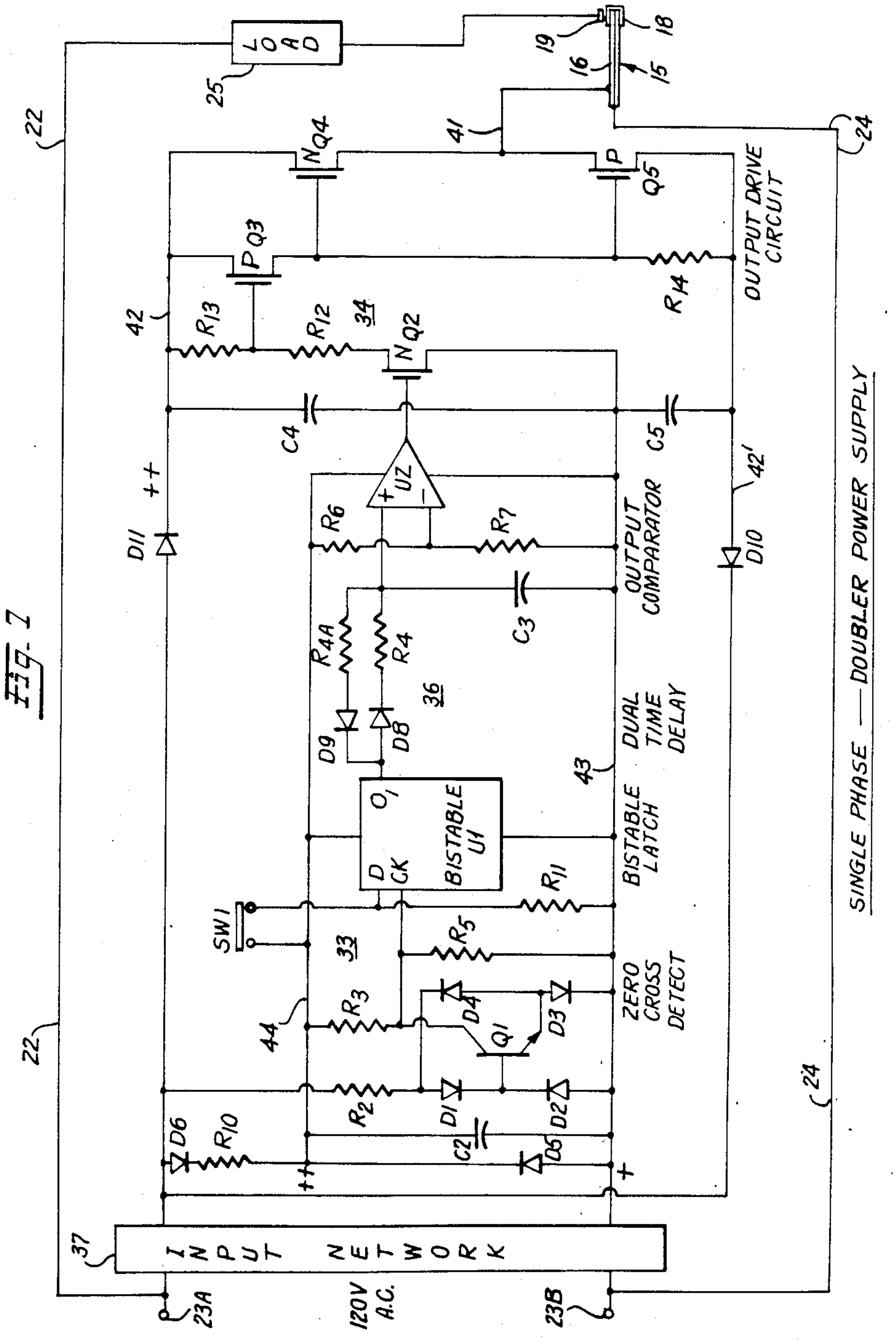
FIG. 7 is a detailed schematic circuit diagram of still a different version of zero crossing synchronous AC switching circuit according to the invention for use with resistive loads and wherein the circuit provides a voltage multiplying effect so that it can be employed with lower voltage AC supply sources or to supply higher power switching devices.

FIG. 7 is a detailed schematic circuit diagram of still another embodiment of a zero crossing synchronous AC switching circuit employing piezoceramic bender-type switching devices according to the invention. The circuit of FIG. 7 is in many respects quite similar to the circuit of FIG. 6 and accordingly like parts of the two circuits have been identified by the same reference numbers and operate in the same manner. The FIG. 7 circuit, however, has been designed for use with a lower voltage alternating current supply source such as a 120 volt AC system normally found in residences. For this purpose, the circuit of FIG. 7 is provided with a high DC voltage doubler rectifier circuit comprised by diode D11, capacitor C4, capacitor C5 and diode D10 connected in the manner shown for developing a high DC voltage of approximately 300 volts across the high voltage DC bus bar conductor 42 measured with respect to the bus bar conductor 42'.

In addition to the above voltage doubling feature, the circuit of FIG. 7 has a differently designed phase shift circuit 36 whereby two different phase shifts can be inserted in the output control potential derived from output terminal O1 of bistable latch U1. In FIG. 7, a first time constant resistor R4 is inserted in effective operating circuit relationship by a steering diode D8 whenever the output terminal O1 goes positive relative to its previous state. Upon switching bistable latch U1 to its opposite condition where the output terminal O1 goes negative relative to its previous state, steering diode D9 inserts a second different time constant determining resistor R4A in effective operating circuit relationship. The consequences of having the two different time constant determining resistors R4 and R4A inserted in the circuit in this manner is to insert one phase shift interval in the timing of the application of bender energization potential to the upper plate of bender member 16 to determine closure of load current carrying switch contacts 18 and 19 relative to the zero crossing of the supply alternating current potential during initiation of current flow through load 25; and, thereafter upon interruption of current flow, to insert a second different phase shift interval during removal of the energization potential for reasons to be discussed more fully hereafter in relation to FIG. 10 of the drawings and its associated timing waveforms.

FIG. 8 is a voltage and current versus time waveshape illustrating the lagging load current induced by an alternating current applied across a reactive load which is highly inductive in nature. As can be determined from FIG. 8, the inductive nature of the load causes the load current to lag the applied line voltage by a predetermined number of electrical degrees which in the FIG. 8 illustration is about 60 degrees lagging. From FIG. 8 it will be appreciated therefor that the applied voltage will have different zero crossings from the load current flowing in the load and in the case shown lead the current zero crossing by a predetermined number of degrees. If as recommended, current interruption occurs at the zero crossings, then it will be appreciated from the dotted line 48 shown in FIG. 8 that there is a potential restrike voltage available at the time of the separation of the load current carrying switch contacts that will tend to restrike an arc between the separated contacts after current interruption. This condition shown in FIG. 8 is for a static inductive load having a fixed power factor. The condition is aggravated in the case of a dynamically changing inductive load, such as an electric motor having a dynamically changing power factor due to changing load conditions on the motor as depicted in FIG. 8A of the drawings wherein it is seen that the phase of the varying inductive load current changes with changes in power factor. This situation increases the demand on the capabilities of zero crossings synchronous AC switching circuits intended for use with reactive loads, whether the reactive load is inductive in nature or capacitive in nature (lagging or momentarily leading). This demand is satisfied in the present invention by providing the switching circuit with a current zero crossing sensing capability and using that current zero crossing capability to achieve interruption of current flow when desired. Since the current zero crossing detector will dynamically track the changing phase of the current zero crossings, proper interruption is assured.

Current sensing transformers are known in the art and have been used in the past as disclosed in the above-noted U.S. Pat. No. 4,392,171 issued on July 5, 1983. By appropriate design of a current transformer core such that the core saturates at very low current levels within desired "current window regions" as shown at 51 in FIG. 8B, it is possible to use specially designed current sensing transformers as current zero crossing detectors. For this purpose, the core of the current zero crossing current transformer is designed such that it has a very small BH hysteresis curve as illustrated in FIG. 8D of the drawings. With such an arrangement as the load current I passes through zero going from its negative half cycle to its positive half cycle (for example) as shown by the dotted outline curve in FIG. 8D, the core of the current sensing transformer will be driven out of saturation in the negative direction, pass through its BH curve and then be driven into saturation in the positive going direction. While the core of the current sensing transformer is saturated, it is incapable of producing any output signal. However, while it is passing through its BH hysteresis curve and the core is unsaturated, it will produce output current pulses in a secondary winding coupled to the core which are used as the current zero crossing timing signals.

Figures 9, 9A:
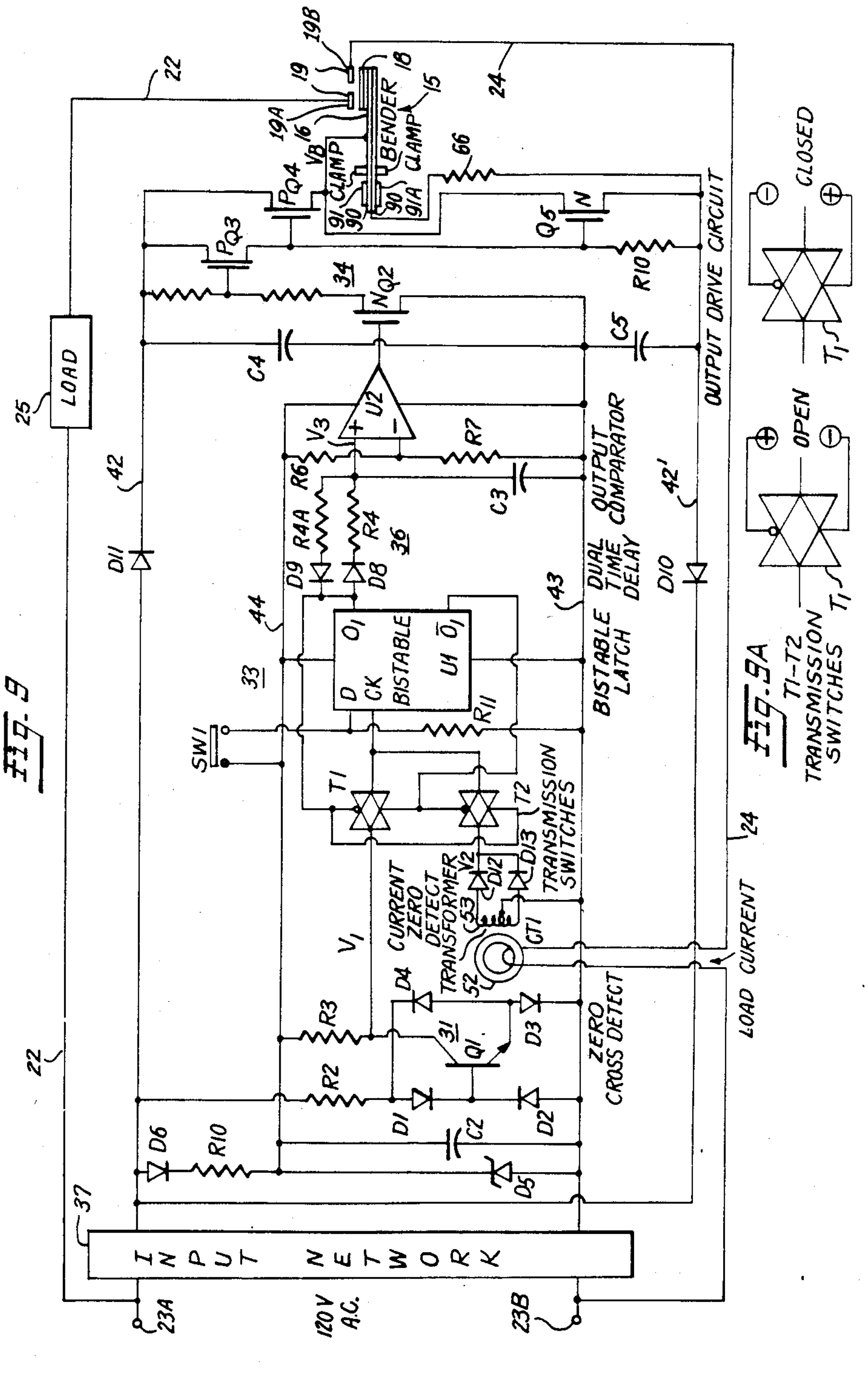
FIG. 9 is a detailed schematic circuit diagram of a zero crossing synchronous AC switching circuit according to the invention that is designed for use with reactive loads.
FIG. 9A is a schematic illustration of the operating characteristics of steering transmission switches employed in the circuit of FIG. 9.

FIG. 9 illustrates a zero crossing synchronous AC switching circuit constructed according to the invention which is intended for use with reactive loads. The zero crossing switching circuit of FIG. 9 is in many respects quite similar to that shown in FIG. 7 of the drawings but differs therefrom in that it includes the capabiltiy of sensing current zero crossings for use in controlling current interruption of the zero crossing synchronous AC switching device. For this purpose, the FIG. 9 circuit includes a current zero crossing detector comprised by a current transformer CT1 having a core 52 designed in the manner described in the preceeding paragraph so that it unsaturates as the reactive load current passes through the zero crossing region shown at 51 in FIG. 8B. Core 52 has one turn of the reactive load current carrying conductor 24 wound around it for sensing purposes and is inductively coupled to a center-tapped secondary winding 53 whose center-tapped point is connected to the negative low voltage DC bus bar conductor 43. The free end of the secondary windings 53 are connected through respective diodes D12 and D13 to the input of a transmission switch T2.

Transmission switch T2 and its counterpart T1 both comprise logic means for processing the current zero crossing signal pulses indicated at V2 and the voltage zero crossing pulses V1 derived from voltage zero crossing sensing circuit means 31 and supplying one or the other to the CK input terminal of bistable latch U1 in the bender energization potential control circuit means 33. The transmission switches T1 and T2 both preferably comprise commercially available logic transmission switches such as the CMOS Quad Analog switch number MC14016B manufactured and sold commercially by the Motorola, Inc. The characteristics of the transmission switches T1 and T2 are described in the above-referenced Motorola MCOS Integrated Circuit Product Specification handbook copyrighted in 1978 and reference is made to that handbook for a more detailed description of the construction and operating characteristics of the transmission switches. Briefly, however, FIG. 9A depicts the characteristics of the transmission switches T1 and T2 wherein it can be seen that if a positive polarity potential is applied to the upper inverted input to the T1 switch identified by the small circle and a negative potential is supplied to its lower input terminal, then the transmission switch is open and will not supply signal currents therethrough in the same manner that the load current carrying switch 18, 19 with its switch contacts 19A and 19B operates in an open state. Conversely, if a negative polarity potential is applied to the upper inverted input to the transmission switch and a positive polarity potential is applied to its lower input terminal, the switch is closed and it will conduct signals therethrough.

The operation of the overall circuit of FIG. 9 will be described more fully hereafter with relation to FIG. 10 of the drawings. However, briefly it should be noted that in its off state with user operated switch SW1 open as shown in FIG. 9, the inverse output terminal $\overline{O1}$ will provide a positive polarity potential to the lower input terminal of transmission switch T1 and to the upper inverted input terminal of transmision switch T2. Correspondingly, the direct output terminal O1 of bistable latch U1 will at the same time apply a negative polarity input potential to the inverted upper input terminal of T1 and to the lower direct input terminal of T2. This causes T2 to assume a signal blocking open condition and T1 to assume a signal conducting closed condition as indicated in FIG. 9A. While thus conditioned, if user operated switch SW1 is closed to provide an enabling potential to the D input terminal of U1, upon the next successive voltage zero crossing signal pulse produced by the voltage zero crossing sensing circuit means 31 it will be supplied through transmission switch T1 to the CK input terminal of U1 and will cause bistable latch U1 to switch its conducting state so that a positive output control potential appears at its direct output terminal O1 and a negative potential appears at its inverse output terminal $\overline{O1}$. This results in placing transmission switch T1 in an open signal blocking condition and transmission switch T2 is a closed signal conducting condition. Thereafter, bistable latch U1 will remain in this set condition and only current zero crossing pulses derived by the current zero sensing circuit CT1 will be supplied to the CK clock input terminal of U1. The current zero crossing timing signal supplied to the clock input terminal CK of bistable latch U1 will have no effect however until such time that the user operated switch SW1 is opened for the purpose of interrupting current flow to the load current carrying switch contacts 18 and 19A, 19B.

Another difference in the construction of the circuit of FIG. 9 compared to that of FIG. 7 is that in the structure of the piezoelectric ceramic bender-type switching device 15, the bender switch 15 shown in FIG. 9 preferably comprises a switching device similar to that illustrated and described with relation to FIG. 3A of above-referenced co-pending U.S. application Ser. No. 685,108 wherein the contact surface formed on the movable end of the bender member 16 is in the form of a conductive bar 18 which is designed to bridge between a set of two spaced apart fixed contacts 19A and 19B upon movement of the bender member 16 to close bridge member 18 on the two fixed contacts 19A and 19B. Load current flow will then take place from input terminal 23A through the load 25, fixed contact 19A, the bridging bar contact 18 and fixed contact 19B back through the load current sensing transformer core of CT1 to the input terminal 23B. The bridging bar contact 18 is electrically isolated from the bender member 16.

The operation of the zero current AC synchronous switching circuit for reactive loads shown in FIG. 9 can best be described with relation to the voltage and current waveforms illustrated in FIGS. 10A–10K. The simplified load circuit block diagram shown in FIG. 10 will help to visualize the events depicted by the waveforms. FIG. 10A is a voltage and current versus time waveform illustrating the lagging load current flow induced in a load by an applied alternating current potential. FIG. 10B illustrates the V1 voltage zero crossing timing pulses produced by the voltage zero crossing sensing circuit 31 and supplied to the input of transmission switch T1. By comparing V1 timing signal pulses to the solid line voltage waveform shown in FIG. 10A it will be seen that these voltage pulses coincide with the zero crossing region of the voltage waveform. FIG. 10C illustrates the enabling-on potential applied to the D input of bistable latch U1 by the user operated on/off switch SW1. From FIG. 10C it will be noted that the user switch SW1 is turned on at 61 by the user and then turned off at 62. During the interval of time between 61 and 62 the high (on) enabling potential is supplied to the D input terminal of U1. FIG. 10D illustrates the clocking input pulses supplied to the CK input terminal to control operation of bistable latch U1 by either transmission switch T1 or transmission switch T2. It should be noted that the initial CK pulses coincide with the voltage zero crossing of the applied line voltage. However, after point 61 when the user on/off switch enables the D input terminal to the bistable latch U1, the coincidence of the enabling potential shown in FIG. 10C with the occurrance of the CK voltage zero crossing pulse shown at 63 in FIG. 10D causes bistable latch U1 to be switched to its set condition wherein its output terminal O1 goes positive as shown in FIG. 10F and its inverse output terminal $\overline{O1}$ goes negative as shown in FIG. 10G. Due to the phase shift induced by the phase shift circuit 36 with the timing resistor R4 operatively connected in the circuit via steering diode D8 a V3 output control potential having the characteristics shown in FIG. 10H is produced at the input to the comparator amplifier U2 wherein the rise in potential to a level adequate to trigger an output from U2 is delayed by the time constant R4-C3. This is reflected in the Q2 input potential illustrated in FIG. 10I as shown at 64 at the point in time when the rise in voltage V3 exceeds the reference potential applied to comparator amplifier U2 and causes it to switch to its on conducting condition and apply an input to the Q2 amplifier stage. Q2, Q3, Q4 and Q5 form an output driver amplifier stage which comprises a part of the bender energizing potential control circuit 34 and serves to develop an amplifier bender energization potential VB that is supplied to the upper piezoceramic plate element of bender member 16 and coincides substantially with the point in time shown at 64.

Thereafter, after a predetermined time period required to charge the capacitance of the piezoelectric ceramic plate element together with additional time required to accommodate contact bounce and other perturbations affecting closure, the bridging contact member 18 closes on fixed contacts 19A and 19B as shown at 65 to initiate current flow through the load 25. The interval of time between point 64 and point 65 is determined primarily by the time constant of the R-C charging circuit comprised by the capacitance of the bender 16 piezoceramic plate element and a timing resistor 66 connected in series circuit relationship with it and supplied from the output of the driver amplifier stage Q4.

It should be noted at this point in the discussion that upon the bistable latch U1 being switched to its set condition, its direct O1 output terminal goes positive and its inverse output terminal $\overline{O1}$ goes negative. This occurrance causes the transmission switch T1 to be switched to its non-conducting open condition and the tranmission switch T2 to be switched to its conducting closed condition as depicted in FIG. 9A of the drawings. Consequently, after the closure of the load current carrying contacts 18–19A, 19B to initiate load current flow, current zero crossing timing pulses produced by current transformer CT1 will be supplied through transmission switch T2 to the CK input of bistable latch U1 as indicated in curve 10D. By tracing the zero crossing timing pulses applied to the CK input terminal as shown in FIG. 10D, it will be seen that these timing pulses now coincide with the load current zero crossings when comparing FIG. 10D with FIG. 10A. The current zero crossing timing pulses will have no effect on the set condition of the bistable latch V1, however, because of the fact that the enabling potential supplied from the now closed user operated switch SW1 continues to be applied. However, at the point in time, shown at 62 in FIG. 10C, when the user operated switch SW1 is opened to remove the enabling potential applied to the D input terminal of bistable switch U1, the current zero crossing timing pulses become effective. After this occurrence, the next succeeding current zero crossing timing pulse shown at 67 in both FIGS. 10D and 10E will cause the bistable latch U1 to be switched to its reset or off condition whereby the potential at its direct output terminal O1 goes negative and the potential at the inverse output terminal O1 goes positive. This results in blocking any further current zero crossing timing pulses through transmission switch T2 but allows through the voltage zero crossing timing pulses via the now closed transmission switch T1 to the CK input terminal. However, in the absence of an enabling potential on the D input terminal from user switch SW1, they will have no effect on the condition of the bistable latch U1.

After bistable latch U1 is reset, the phase shift circuit 36 will be under the timing control of timing resistor R4A via the steering diode D9 so as to allow the bender energizing control potential V3 shown in FIG. 10H to decrease in voltage value until it drops below the reference voltage value applied to comparator amplifier U2 and switches the comparator to its off condition at the point in time shown at 68 in FIG. 10. This results in concurrently removing the bender energizing potential VB from the piezoceramic plate element of bender 16 as shown at 68 in FIG. 10J by turning on transistor Q5 and turning off the driver amplifier stage Q4 and Q3 as a result of the turn-off of Q2 by the U2 comparator. At the point in time shown at 69 in FIG. 10K, the charge on the piezoelectric ceramic plate element of bender 16 will have been bled off sufficiently to allow the bender to return to its normal, nonenergized position where the movable contact 18 is separated from fixed contacts 19A and 19B to thereby interrupt current flow to the load 25.

FIG. 11 is a functional schematic drawing of a preferred embodiment of the invention which includes a zero crossing synchronous AC switching circuit 10, by way of illustration, constructed as described with relation to any of FIGS. 6, 7 or 9 and which further includes a bender member energizing potential control circuit shown generally at 71. The control circuit 71 is comprised by a very high resistance resistor 72 that is connected in series circuit relationship with a relatively low value resistance timing resistor 66. The capacitor CB-16A is formed by the capacitance of the upper piezoceramic plate element 16A of bender member 16 shown physically in FIG. 11 of the drawings below its schematic representation in the control circuit diagram. The high resistance resistor 72 which may have a resistance value of the order of 1 megohm introduces a long RC time constant charging network in the current path supplying electric energizing potential to the bender member piezoceramic plate element 16A that will considerably reduce the rate of charging the capacitance CB-16A of the bender plate capacitor element by the zero crossing synchronous AC switching circuit 10 as shown at 81 in FIG. 11B.

Control circuit 71 further includes a current transformer saturable core CT2 having a primary winding wound therethrough formed by a loop in the alternating current power supply conductor 24 supplying AC load current to a load 25 via bender operated switch contacts 18 and 19 and conductor 22. The saturable core transformer CT2 further includes a secondary winding 73 that is connected to the control gate of a silicon control recitfier (SCR) 74. The SCR 74 is connected in parallel circuit relationship across the high resistance value resistor 72 in a manner such that when it is rendered conductive, it effectively shorts out the high resistance resistor 72. In this circuit, a very large 2 megohm bleeding resistor 75 is connected in parallel circuit relationship across the capacitance CB-16A of the bender plate element 16A to assure that it is completely discharged after each energization thereof. Resistor 75 does not appreciably voltage divide the supply source voltage. Hence, upon turn-on of SCR 74, a stepped increase to the maximum available voltage from the supply source is applied to the bender member as shown in FIG. 11B at 82.

In operation, upon the zero crossing synchronous AC switching circuit 10 being gated-on to supply the bender energizing potential VB to the bender plate element 16A, it initially is supplied through the high resistance 1 megohm resistor 72 to the bender element capacitor CB-16A. This results in introducing an extremely long time constant of the order of 50 milliseconds in the charging rate of the bender plate element capacitor CB-16A as shown at 81 in FIG. 11B of the drawings. FIG. 11A of the drawings shows the time interval in one half cycle of an alternating current potential having a nominal frequency of 60 hertz is about 8.3 milliseconds. Thus, it will be appreciated that the long time constant of 50 milliseconds will require several half cycles of the applied alternating current potential before the bender plate will be charged sufficiently to initially touch or close the movable contact 18 on fixed contact 19. As a result, ripple variations on the supply AC voltage such as shown in FIG. 2E have minimal effect on the charging rate, and substantially steady DC energizing potential is applied to the bender plate capacitor CB-16A.

As shown in FIG. 11B, upon the initial touch of the contacts 18 and 19, at least some load current will flow through the current transformer CT2 which is coupled to the secondary 73 and produce a gating-on pulse to turn-on the SCR 74. Upon turn-on of SCR 74, the 1 megohm resistor 72 will be removed from the circuit substantially instantaneously. Upon this occurrance, the full bender voltage VB supplied from the output of the synchronous switching circuit 10 effectively will be applied across the bender plate element so as to fully charge it almost instantaneously as shown at 82 in FIG. 11B and cause it forcefully to clamp movable contact 18 to fixed contact 19 and minimize or eliminate any contact bounce. Since the bender capacitor is fully charged in microseconds, the bender force is applied to greatly increase the compressive force on the contacts and little or no acceleration forces are induced which otherwise would result in undesirable bounce. Further, the application of the full bender charging voltage at this point substantially increases the compressive force applied by the bender member to the contacts to keep them from separating (i.e. bouncing) after closure and also thereby minimizes contact welding phenomena that are associated with low contact compressive forces.

FIG. 11C is a plot of the load current versus time showing that as the load current builds up following initial contact engagement, it will saturate the core of the current transformer CT2 and thereby result in the production of the current pulse which turns on SCR 74 at the point in question. The SCR will remain conductive until there is full voltage on the bender capacitance and then automatically will reset to its open circuit condition due to lack of sufficient holding current. This will result in reinserting the 1 megohm resistor 72 into the circuit. The discharge rate of the bender capacitor CB-16A will be controlled primarily by the bleeder resistor 75 when the energizing potential applied across conductor 41 is removed. The bleeder resistor 75 is proportioned to provide discharge of the bender plate capacitor CB-16A at a rate sufficient to assure the separation or opening speed of about 1 inch per second when circuit 10 turns off. This speed of opening is adequate to assure that sufficient gap between the contacts is produced to prevent restriking and arcing between the contacts as they open. It should be noted that the circuit of FIG. 11 can also operate with other DC energizing potential sources such as a rectifier supply and a user actuated switch.

From the foregoing description it will be appreciated that the invention makes available to the industry new and improved zero crossing synchronous AC switching circuits employing piezoceramic bender type switching devices that are relatively much faster responding than electromagnetic operated power switching circuits, and while considerably slower responding than switching circuits which employ power semiconductor devices, the switching circuits made available by the present invention in the off condition provide an open circuit ohmic break in circuit in which they are used to control electric current flow through a load in conformance with U.L. requirements. Switching circuits constructed according to the invention do not require semiconductor aided commutation or turn-off assistance circuitry or other components that would introduce high resistance current leakage paths in the AC supply current path to a load and/or additional circuit complexity, cost and power dissipation, such as a snubber. The novel zero crossing synchronous AC switching circuit preferably employ novel piezoelectric ceramic bender-type switching devices of the type described and claimed in co-pending U.S. application Ser. No. 685,109 and U.S. patent application Ser. No. 685,108, both filed concurrently with this application. The novel zero crossing synchronous AC switching circuits further include piezoelectric ceramic bender-type switching device bender member energizing potential control circuit means that initially impresses a relatively low voltage electric energizing potential across the bender member of the switching device to soften its movement and curtail contact bounce and after initial contact closure increasing the energizing potential to increase contact compressive force after initial contact closure.

In physically constructing the noval zero crossing synchronous AC switching circuits according to the invention, it is preferred that the circuits be fabricated in microminiaturized integrated circuit package form (as shown at 91 and 91A in FIG. 9) and be physically mounted on non-prepolarized portions of the piezoceramic plate elements 90. The portions 90 extend beyond the clamps in a direction away from the movable contact end 18 of the bender member in the manner explained more fully in the above-noted co-pending application Ser. No. 685,109.

INDUSTRIAL APPLICABILITY

The invention provides a new family of zero crossing synchronous AC switching circuits employing piezoceramic bender-type switching devices for use in residential, commercial and industrial electrical supply systems. The novel switching circuits thus provided can be employed to operate both resistive and reactive loads either of an inductive or capacitive nature by the inclusion of a current zero crossing detector and appropriate adjustment of phase shift networks comprising an essential part of the switching circuits.

Having described several embodiments of zero crossing synchronous AC switching circuits employing piezoceramic bender-type switching devices constructed in accordance with the invention, it is believed obvious that other modifications and variations of the invention will be suggested to those skilled in the light of the above teachings. It is therefore to be understood that changes may be made in the particular embodiments of the invention described which are within the full intended scope of the invention as defined by the appended claims.

What is claimed is:

1. A zero crossing synchronous AC switching circuit for alternating current systems employing at least one piezoelectric ceramic bender-type switching device having load current carrying electric switch contacts and at least one prepolarized piezoelectric ceramic bender number for selectively closing or opening the electric switch contacts to control load current flow therethrough, said prepolarized piezoelectric ceramic bender member comprising a pair of planar prepoled piezoelectric ceramic plate elements secured in opposed parallel relationship sandwich fashion on opposite sides of a central conductive surface and having respective outer conductive surfaces that are insulted from each other and the central conductive surface by the respective intervening piezoelectric ceramic plate element thickness, said piezoelectric ceramic bender member further carrying at least one movable contact which coacts with a fixed contact to open and close the electric switch contact means of said switching device, zero crossing sensing circuit means for sensing the passage through zero value of a supply source of alternating current applied across the circuit and for deriving a zero crossing timing signal representative of the occurrence of the zero crossings, bender energization potential control circuit means responsive to the zero crossing timing signals for selectively controlling application and removal of a bender energizing potential across a piezoelectric ceramic bender member of the bender-type switching device to selectively apply said bender energization potential to each piezoelectric ceramic plate element and having the same polarity as the polarity of the prepole electric field previously permanently induced in said prepoled piezoelectric ceramic plate elements so that no depolarization of said piezoelectric ceramic plate elements occurs during successive operations of the switching device, and phase shift circuit means effectively responsive to the applied alternating current for shifting the timing of the application and removal of the bender energizing potential to the piezoelectric ceramic bender member by a preselected phase shift interval relative to the naturally occurring zero crossings of the applied alternating circuit.

2. A zero crossing synchronous AC switching circuit according to claim 1 further including at least one signal level user operated on-off switch connected to said bender energizing potential control circuit means for selectively activating or deactivating the bender energizing potential control circuit means upon user demand in conjunction with the zero crossing timing signals.

3. A zero crossing synchronous AC switching circuit according to claim 2 wherein the period of time corresponding to the preselected phase shift interval introduced by said phase shift circuit means is sufficient to accommodate at least the capacitance charging time of the piezoelectric ceramic bender member and the time required for the bender-type switching device to move the bender member and close or open the set of load current carrying switch contacts and therby supply or interrupt alternating current flow through a load substantially at or as close to the naturally occurring zero crossings as possible.

4. A zero crossing synchronous AC switching circuit according to claim 3 wherein the preselected phase shift interval introduced by the phase shift circuit means leads the naturally occurring zero crossing of the applied alternating current and the period of time corresponding to the preselected phase shift interval further includes time required to accommodate any contact bounce that occurs during closure and/or opening of the load current carrying switch contacts and other microscopically occurring switch contact perturbations in order that current extinction through the load current carrying switch contacts during opening and establishment of current flow during closure of the switch contacts occurs at or close to the naturally occurring zero crossings of the applied alternating current.

5. A zero crossing synchronous AC switching circuit according to claim 4 wherein the circuit is designed for use with an applied alternating current having a nominal frequency of 60 hertz and the period of time corresponding to the preselected phase shift interval is of the order of ten (10) milliseconds.

6. A zero crossing synchronous AC switching circuit according to claim 1 further including load current carrying terminal bus bar conductor means for interconnecting the load via said bender actuated load current carrying switch contacts across the source of applied alternating current at interconnection points in advance of the zero crossing sensing circuit means.

7. A zero crossing synchronous AC switching circuit according to claim 4 further including load current carrying terminal bus bar conductor means for interconnecting the load via said bender actuated load current carrying switch contacts across the source of applied alternating current at interconnection points in advance of the zero crossing sensing circuit means.

8. A zero crossing synchronous AC switching circuit according to claim 1 further including an input network interconnected between the source of the applied alternating current and the zero crossing sensing circuit means and wherein the input network comprises a metal oxide varistor voltage transient suppressor and a filter network connected between the source of alternating current and the input to the zero crossing sensing circuit means.

9. A zero crossing synchronous AC switching circuit according to claim 7 further including an input network interconnected between the source of the applied alternating current and the zero crossing sensing circuit means and wherein the input network comprises a metal oxide varistor voltage transient suppressor and a filter network connected between the source of alternating current and the input to the zero crossing sensing circuit means, and wherein the terminal bus bar conductor means interconnecting the load and load current carrying switch contacts of the bender-type switching device are connected across the applied alternating current source in advance of the input network.

10. A zero crossing synchronous AC switching circuit according to claim 1 wherein the load being supplied is essentially resistive in nature and the voltage and current zero crossings are substantially in phase and occur substantially concurrently in time.

11. A zero crossing synchronous AC switching circuit according to claim 9 wherein the load being supplied is essentially resistive in nature and the voltage and current zero crossings are substantially in phase and occur substantially concurrently in time.

12. A zero crossing synchronous switching circuit according to claim 1 wherein the load being supplied is reactive in nature and the current zero crossings either lag or lead the voltage zero crossings in phase and time of zero crossings and the zero crossing synchronous AC switching circuit includes both voltage and current zero crossing sensing circuit means.

13. A zero crossing synchronous switching circuit according to claim 9 wherein the load being supplied is reactive in nature and the current zero crossings either lag or lead the voltage zero crossings in phase and time of zero crossings and the zero crossing synchronous AC switching circuit includes both voltage and current zero crossing sensing circuit means.

14. A zero crossing synchronous AC switching circuit according to claim 13 wherein the voltage and current zero crossing sensing circuit means comprises voltage zero crossing sensing circuit means for deriving a voltage zero crossing timing signal and current zero crossing sensing circuit means for deriving a current zero crossing timing signal and said bender energization potential control circuit means includes logic circuit means responsive to said voltage zero crossing and current zero crossing timing signals and said user operated switch means for processing and utlizing the voltage zero crossing and current zero crossing timing signals to derive a bender energization control signal for selectiely controlling application to and removal of a bender electric energization potential from the bender member of the piezoelectric ceramic bender type switch device in response to the user operated switch means.

15. A zero crossing synchronous AC switching circuit according to claim 1 wherein said phase shift circuit means includes two separate phase shift circuits providing different phase shift intervals together with respectively connected steering diode means for interconnecting one of the phase shift circuits in effective operating circuit relationship in the zero crossing synchronous AC switch during application of a bender energization potential to the piezoceramic switching device bender member to close the load current carrying switch contacts of the bender-type switching device and thereby provide load current flow therethrough after a first preselected phase shift interval, said steering diode means also serving to interconnect the other of the phase shift circuits in effective operating circuit relationship in the synchronous AC switching circuit during removal of energization potential from the bender member of the switching device to thereby effect opening of the load current carrying switch contacts and terminate load current flow therethrough after a second and different preselected phase shift interval.

16. A zero crossing synchronous AC switching circuit according to claim 14 wherein said phase shift circuit means includes two separate phase shift circuits providing different phase shift intervals together with respectively connected steering diode means for interconnecting one of the phase shift circuits in effective operating circuit relationship in the zero crossing synchronous AC switch during application of a bender energization potential to the piezoceramic switching device bender member to close the load current carrying switch contacts of the bender-type switching device and thereby provide load current flow therethrough after a first preselected phase shift interval, said steering diode means also serving to interconnect the other of the phase shift circuits in effective operating circuit relationship in the synchronous AC switching circuit during removal of energization from the bender member of the switching device to thereby effect opening of the load current carrying switch contacts and terminate load current flow therethrough after a second and different preselected phase shift interval.

17. A zero crossing synchronous AC switching circuit according to claim 1 wherein said bender energization potential control circuit means includes means for initially including a relatively slow R-C time constant charging resistor in the DC current charging path for applying electric energizing potential to a plate element of the bender member and load current controlled bender voltage control means responsive to low initial values of load current flow through the load current carrying contacts of the switching device for almost instantly removing the slow R-C time constant charging resistor from the DC charging current path and increase the energizing potential applied to the bender member to substantially the full voltage value of the available DC energizing potential source to thereby enhance contact closure and reduce contact bounce and to increase contact compressive force after initial contact closure.

18. A zero crossing synchronous AC switching circuit according to claim 16 wherein said bender energization potential control circuit means includes means for initially including a relatively slow R-C time constant charging resistor in the DC current charging path for applying electric energizing potential to a plate element of the bender member and load current controlled bender voltage control means responsive to low initial values of load current flow through the load current carrying contacts of the switching device for almost instantly removing the slow R-C time constant charging resistor from the DC charging current path and increase the energizing potential applied to the bender member to substantially the full voltage value or the available DC energizing potential source to thereby enhance contact closure and reduce contact bounce and to increase contact compressive force after initial contact closure.

19. A zero crossing synchronous AC switching circuit according to claim 18 wherein the load current controlled bender voltage control means comprises a load current sensing transformer having its primary winding connected in series circuit relationship with the load current carrying contacts of the bender-type switching device, a relatively large voltage dropping resistor connected in the excitation current path supplying energizing potential to the bender member of the switching device, and a gate controlled semiconductor switching device connected in parallel circuit relationship with said voltage dropping resistor and having its control gate excited by the secondary winding of the current sensing transformer whereby after initially supplying a relatively low charging current through the slow R-C time constant charging resistor to the bender member of the switching device to cause it to build up the voltage value of the energizing electric potential on the bender member at a slow rate and to close the load current carrying contacts relatively slowly and softly to initiate load current flow, the load current sensing transformer produces a gating-on pulse in its secondary winding which gates on the gate controlled semiconductor switching device and causes it to bypass the slow time constant charging resistor and thereby suddenly increase the value of the energizing potential applied to the bender member to a relatively larger value.

20. A zero crossing synchronous AC switching circuit according to either of claims 1, 2, 16, 17, 18 and 19 wherein the piezoelectric ceramic bender type switching device includes both the load current carrying switch contacts and the prepolarized portions of the piezoelectric ceramic bender member are mounted within a protective gastight enclosure.

21. A zero crossing synchronous AC switching circuit according to claims 1, 2, 16, 17, or 18 wherein the load current carrying contacts of the piezoelectric ceramic bender-type switching device are fabricated from an alloy consisting essentially of copper and vanadium.

22. A zero crossing synchronous AC switching circuit according to claims 1, 2, 16, 17, or 18 wherein the zero crossing synchronous AC switching circuit includes two separate switching circuits substantially identical to the switching circuit set forth in claim 1 electrically excited from the same AC supply source with one of the circuits being connected to supply bender energizing potentials to one of the piezoelectric ceramic plate elements and the remaining circuit being connected to supply bender energizing potential to the remaining pizeoelectric ceramic plate element of the piezoelectric ceramic bender type-switching device.

23. A zero crossing synchronous AC switching circuit according to claim 1 wherein the piezoelectric ceramic bender member is formed by two planar piezoelectric ceramic plate elements each having separate electrically conductive surfaces formed on the outer and inner surfaces thereof and being physically secured together in a unitary sandwich-like structure by a thin electrically insulating adhesive layer formed between the adjacent inner conductive surfaces of the plate elements whereby it is possible to maintain independent control of the value of the electric energizing potentials applied to the piezoceramic plate elements of the switching device bender member.

24. A zero crossing synchronous AC switching circuit for AC systems supplying reactive loads, said zero crossing synchronous AC switching circuit comprising at least one piezoelectric ceramic bender-type switching device having load current carrying switch contacts and at least one prepolarized piezoelectric ceramic bender member for selectively closing or opening the electric switch contacts to control load current flow to a reactive load connected thereto, said prepolarized piezoelectric ceramic bender member comprising a pair of planar prepoled piezoelectric ceramic plate elements secured in opposed parallel relationship sandwich fashion on opposite sides of a central conductive surface and having respective outer conductive surfaces that are insulated from each other and the central conductive surface by the respective intervening piezoelectric ceramic element thickness, said piezoelectric ceramic bender member further carrying at least one movable contact which coacts with a fixed contact to open and close the electric switch contact means of said switching device, voltage zero crossing sensing circuit means for sensing the passage through the zero voltage value of a supply source of alternating current applied across the circuit and for deriving a voltage zero crossing timing signal representative of the occurrence of the voltage zero crossings, current zero crossing sensing circuit means for sensing the passage through zero current value of load current flowing through the load current carrying contacts of the switching device while closed and for deriving a current zero crossing timing signal representative of the occurrence of the current zero crossings, logic circuit means responsive to the voltage and current zero crossing timing signals for use in deriving bender energization control signals representative of the desired time of closure and opening of the load carrying electric switch contacts of the bender-type switching device, phase shift circuit means for shifting the timing of the bender energization control signals by a predetermined phase shift interval relative to the naturally occuring zero crossing of the applied alternating current and voltage, user operated on-off switch means connected to said logic circuit means for selectively enabling and disenabling said logic circuit means and acting in conjunction with said voltage and current zero crossing timing signals to derive the bender energization control signals, output drive amplifier circuit means responsive to the bender energization control signals from said logic circuit means for deriving relatively high voltage electric bender energization potentials to selectively apply said bender energization potentials to each piezoelectric ceramic plate element and having the same polarity as the polarity of the prepoled piezoelectric ceramic plate elements so that no depolarization of said piezoelectric ceramic plate elements occurs during successive operations of the switching device, and means for coupling the piezoelectric ceramic bender member of the bender-type switching device to the output from the output drive amplifier circuit means for selectively energizing or de-energizing the bender member in response to the bender energization control signals from said logic circuit means to cause the load current carrying switch contacts to close or open at or near the zero crossings of the supply alternating current.

25. A zero crossing synchronous AC switching circuit according to claim 24 wherein said logic circuit means comprises bistable latching circuit means having an enabling input terminal connected to said user operated on-off switch means, a clock input terminal, and at least one output terminal, and steering transmission switch means connected between the outputs from said voltage and said current zero crossing sensing circuit means and the clock input terminal for selectively applying either said voltage or said current zero crossing signals to said clock input terminal, said bistable latching circuit means serving to derive the bender energization control signals at its output terminal for supply to the output drive amplifier circuit means and for controlling said steering transmission switch means.

26. A zero crossing synchronous AC switching circuit according to claim 25 wherein said phase shift circuit means is connected to the output terminal of said bistable latching circuit in advance of the output drive amplifier circuit means and wherein the phase shift circuit means includes two separate phase shift circuits providing different phase shift intervals and respectively connected steering diode means for connecting one of the phase shift circuits in effective operating circuit relationship in the zero crossing synchronous AC switch during energization of the piezoceramic bender member to thereby close the load current carrying switch contacts and provide load current flow therethrough after a first preselected phase shift interval, and for interconnecting the other of the phase shift circuits in effective operating circuit relationship in the synchronous AC switching circuit during removal of energization potential from the bender member to thereby effect opening of the load current carrying switch contacts and terminate load current flow therethrough after a second and different preselected phase shift interval.

27. A zero crossing synchronous AC switching circuit according to claim 26 wherein the period of time corresponding to the preselected phase shift interval indroduced by said phase shift circuit means is sufficient to accommodate at least the capacitance charging time of the piezoelectric ceramic bender member and the time required for the bender-type switching device to move the bender member and close or open the set of load current carrying switch contacts to therby supply or interrupt alternating current flow through a load.

28. A zero crossing synchronous AC switching circuit according to claim 27 wherein the preselected phase shift interval introduced by the phase shift circuit means leads the naturally occurring zero crossing of the applied alternating current and the period of time corresponding to the preselected phase shift interval includes time required to accommodate any contact bounce that occurs during closure and/or opening of the load current carrying switch contacts and other microscopically occurring switch contact perturbations in order that current extinction through the load current carrying switch contacts during opening and establishment of current flow during closure of the switch contacts occurs at or close to the naturally occurring zero crossings of the applied alternating current.

29. A zero crossing synchronous AC switching circuit according to claim 26 wherein the circuit is designed for use with an applied alternating current having a nominal frequency of 60 hertz and the period of time corresponding to the preselected phase shift interval is of the order of ten (10) milliseconds.

30. A zero crossing synchnonous AC switching circuit according to claim 28 further including load current carrying terminal bus bar conductor means for interconnecting the load via said bender actuated load current carrying switch contacts across the source of applied alternating current at interconnection points in advance of the zero crossing sensing circuit means.

31. A zero crossing synchronous AC switching circuit according to claim 30 further including an input network interconnected between the source of the applied alternating current and the zero crossing sensing circuit means and wherein the input network comprises a metal oxide varistor voltage transient suppressor and a filter network connected between the source of alternating current and the input to the zero crossing sensing circuit means, and wherein the terminal bus bar conductor means interconnecting the load and load current carrying switch contacts of the bender-type switching device are connected across the applied alternating current source in advance of the input network.

32. A zero crossing synchronous AC switching circuit according to claim 26 wherein said energizing potential output coupling means includes means for initially including a relatively slow R-C time constant charging resistor in the DC current charging path for applying electric energizing potential to a plate element of the piezoelectric ceramic bender member and load current controlled bender voltage control means responsive to low initial values of load current flow through the load current carrying contacts of the switching device for almost instantaneously removing the slow R-C time constant charging resistor from the DC charging current path and increase the energizing potential applied to the bender member to substantially the full voltage value obtainable from the DC energizing potential source to thereby enhance contact closure and reduce contact bounce and to increase contact compressive force after initial contact closure.

33. A zero crossing synchronous AC switching circuit according to claim 31 wherein said energizing potential output coupling means includes means for initially including a relatively slow R-C time constant charging resistor in the DC current charging path for applying electric energizing potential to a plate element of the piezoelectric ceramic bender member and load current controlled bender voltage control means responsive to low initial values of load current flow through the load current carrying contacts of the switching device for almost instantaneously removing the slow R-C time constant charging resistor from the DC charging current path and increase the energizing potential applied to the bender member to substantially the full voltage value obtainable from the DC energizing potential source to thereby enhance contact closure and reduce contact bounce and to increase contact compressive force after initial contact closure.

34. A zero crossing synchronous AC switching circuit according to claim 33 the load current controlled bender voltage control means comprises a load current sensing transformer having its primary winding connected in series circuit relationship with the load current carrying contacts of the bender-type switching device, a relatively large voltage dropping slow R-C time constant charging resistor connected in the excitation current path supplying energizing potential to the bender member of the switching device, and a gate controlled semiconductor switching device connected in parallel circuit relationship with said voltage dropping resistor and having its control gate excited by the secondary winding of the current sensing transformer whereby after initially supplying a relatively low charging current through the slow R-C time constant charging resistor to the bender member to cause it to build up the voltage value of the energizing electric potential to the bender member of the bender-type switching device at a relatively slow rate and cause it to close the load current carrying contacts relatively slowly and softly to initiate load current flow, the load current sensing transformer produces a gating-on pulse in its secondary winding which gates on the gate controlled semiconductor device and causes it to bypass the slow R-C time constant charging resistor and thereby suddenly increase the value of the energizing potential applied to the bender member to a relatively larger value.

35. A zero crossing synchronous AC switching circuit according to either of claims 1, 2, 16, 17, 18, 19, 26, 31, 33 or 36 wherein the piezoelectric ceramic bender member includes non-prepoled piezoceramic plate element portions and the zero crossing synchronous AC switching circuit is fabricated in miniaturized integrated circuit form with the integrated circuit package being physically mounted on the non-prepoled piezoceramic plate element portions to theregy greatly reduce stray impedance effects normally encountered in the operatin of such circuits.

36. A piezoelectric ceramic bender-type switching device bender member energizing potential control circuit including means for initially including a relatively slow R-C time constant charging resistor in the DC current charging path for applying energizing potential to a bender member plate element of the piezoelectric ceramic switching device and load current controlled bender voltage control means responsive to low initial values of load current flow through the load current carrying contacts of the switching device for almost instantly removing the slow R-C time constant charging resistor from the DC charging current path and increase constant charging resistor from the DC charging current path and increase the voltage value of the energizing potential applied to the bender member to substantially the full voltage value obtainable from the DC energizing potential source to thereby to enhance contact closure and reduce contact bounce and to increase contact compressive force after initial contact closure.

37. A piezoelectric bender-type switching device bender member energizing potential control circuit according to claim 36 wherein the load current controlled bender voltage control means comprises a load current sensing transformer having its primary winding connected in series circuit relationship with the load current carrying contacts of the bender-type switching device, a relatively large voltage dropping slow R-C time constant charging resistor connected in the excitation current path supplying energizing potential to the bender member of the switching device, and a gate controlled semiconductor switching device connected in parallel circuit relationship with said large voltage dropping slow R-C time constant charging resistor and having its control gate excited by the secondary winding of the current sensing transformer whereby after initially supplying a relatively low value DC charging current to the bender member of the bender-type switching device to cause it to close the load current carrying contacts relatively slowly and softly to initiate load current flow, the load current sensing transformer produces a gating-on pulse in its secondary winding which gates on the gate controlled semiconductor device and causes it to bypass the large voltage dropping slow R-C time constant charging resistor and thereby suddenly increase the value of the energizing potential applied to the bender member to substantially the full voltage value obtainable from the DC energizing potential source.

38. A piezoelectric bender-type switching device bender member energizing potential control circuit according to either claim 36 or 37 wherein the means for supplying an electric energizing potential to the piezoceramic bender member comprises a zero crossing synchronous AC switching circuit for energizing the bender member via the relatively large voltage dropping slow R-C time constant charging resistor.

39. A piezoelectric ceramic bender-type switching device bender member energizing potential control circuit according to either claim 34 or 37 wherein the piezoelectric ceramic bender member includes non-prepoled piezoceramic plate element portions and the bender member energizing potential control circuit is fabricaed in miniaturized integrated circuit form with the integrated circuit package being physically mounted on the non-prepoled piezoceramic plate element portions to thereby greatly reduce stray impedance effects normally encountered in the operation of such circuits.

40. A bender member potential control system for a switching circuit employing at least one piezoelectric ceramic bender-type switching device having load current carrying electric switch contacts and at least one prepolarized piezoelectric ceramic bender member for selectively closing or opening the electric switch contacts to control load current flow therethrough with the prepolarized piezoelectric ceramic bender member being comprised by two separate pizeoelectric ceramic plate elements sandwiched together into a unitary structure with electric conductive surfaces formed on both the inner and outer facing surfaces of the piezoelectric ceramic plate elements, said piezoelectric ceramic bender member further carrying at least one movable contact which coacts with a fixed contact as the means to close or open the electric switch contacts of said switching device, said bender member potential control system including two separate switching circuits with one of the switching circuits being connected to supply prolonged bender energizing potential of indefinite duration to one of the piezeoelectric ceramic plate elements from a bender energization potential supply source and the remaining circuit being connected to supply pulse-like bender energization potential of short time duration to the remaining piezoelectric plate element of the piezoelectric ceramic bender-type switching device for pull-away assistance during current interruption by the bender-type switching device, both bender energization potential being applied with the same polarity as the polarity of the prepoled piezoelectric ceramic plate elements so that no depolarization of said piezoelectric ceramic plate elements occurs during successive operations of the switching device.

41. A bender member potential control system according to claim 40 wherein the piezoelectric ceramic bender member includes non-prepoled pieozoceramic plate element portions and the two separate switching circuits are fabricated in miniaturized integrated circuit form with the integrated circuit package being physically mounted on the non-prepoled piezoceramic plate element portions to thereby greatly reduce stray impedance effects normally encounter in the operation of such circuits.

* * * * *